United States Patent
Sawai et al.

(10) Patent No.: US 10,581,283 B2
(45) Date of Patent: Mar. 3, 2020

(54) METHOD FOR CONTROLLING POWER TRANSMITTING DEVICE, METHOD FOR DETECTING FOREIGN OBJECT, AND POWER TRANSMITTING DEVICE IN WIRELESS POWER TRANSMISSION SYSTEM

(71) Applicant: Panasonic Intellectual Property Management Co., Ltd., Osaka (JP)

(72) Inventors: Tetsuro Sawai, Osaka (JP); Hiroyuki Matsuo, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 182 days.

(21) Appl. No.: 15/828,917

(22) Filed: Dec. 1, 2017

(65) Prior Publication Data

US 2018/0166929 A1    Jun. 14, 2018

(30) Foreign Application Priority Data

Dec. 14, 2016   (JP) ................. 2016-242035

(51) Int. Cl.
*H02J 50/60* (2016.01)
*H02J 50/12* (2016.01)
*H01F 38/14* (2006.01)
*G01V 9/00* (2006.01)
*H02J 7/02* (2016.01)
(Continued)

(52) U.S. Cl.
CPC ............. *H02J 50/60* (2016.02); *B60L 53/12* (2019.02); *B60L 53/124* (2019.02); *G01K 3/08* (2013.01);
(Continued)

(58) Field of Classification Search
CPC .... B60L 53/12; B60L 2240/36; B60L 53/124; H02J 50/60; H02J 7/025; H02J 50/90;
(Continued)

(56) References Cited

U.S. PATENT DOCUMENTS

2013/0241476 A1    9/2013  Okada et al.
2014/0239735 A1*   8/2014  Abe ................. B60L 53/12
                                                  307/104
(Continued)

FOREIGN PATENT DOCUMENTS

EP         2755301 A1    7/2014
EP         3050738       8/2016
(Continued)

OTHER PUBLICATIONS

The Extended European Search Report dated May 18, 2018 for the related European Patent Application No. 17206341.4.

*Primary Examiner* — Jared Fureman
*Assistant Examiner* — Duc M Pham
(74) *Attorney, Agent, or Firm* — Renner, Otto, Boisselle & Sklar, LLP

(57) ABSTRACT

A method for controlling a power transmitting device is a method for detecting a metal foreign object by controlling the power transmitting device including a power transmitting coil that outputs power to a power receiving coil and a thermal sensor that measures a surface temperature of the metal foreign object on the power transmitting coil. The method includes causing the power transmitting coil to output the power before the coils are electromagnetically coupled with each other and a mobile object including the power receiving coil overlaps the power transmitting coil, causing the thermal sensor to measure the surface temperature of the metal foreign object, and transmitting, if the measured surface temperature of the metal foreign object is equal to or higher than a threshold, a signal indicating presence of the metal foreign object to another receiving apparatus, other than the power transmitting device, having a function of receiving the signal.

13 Claims, 29 Drawing Sheets

(51) Int. Cl.
    *G01K 3/08*     (2006.01)
    *G01V 3/10*     (2006.01)
    *H02J 50/90*     (2016.01)
    *B60L 53/124*     (2019.01)
    *H02J 50/80*     (2016.01)
    *B60L 53/12*     (2019.01)

(52) U.S. Cl.
    CPC ................ *G01V 3/10* (2013.01); *G01V 9/005* (2013.01); *H01F 38/14* (2013.01); *H02J 7/025* (2013.01); *H02J 50/12* (2016.02); *H02J 50/80* (2016.02); *H02J 50/90* (2016.02); *B60L 2240/36* (2013.01)

(58) Field of Classification Search
    CPC . H01F 38/14; G01K 3/08; G01V 3/10; G01V 9/005
    See application file for complete search history.

(56) References Cited

U.S. PATENT DOCUMENTS

2016/0254707 A1*   9/2016   Fujiwara ................ H02J 50/12
                                                             307/104
2017/0043672 A1*   2/2017   Araki ........................ H02J 7/00

FOREIGN PATENT DOCUMENTS

| JP | 2001-275280 | 10/2001 |
|---|---|---|
| JP | 2012-249400 | 12/2012 |
| JP | 2013-192411 | 9/2013 |
| JP | 2015-057020 | 3/2015 |
| WO | 2016/002619 A1 | 1/2016 |

\* cited by examiner

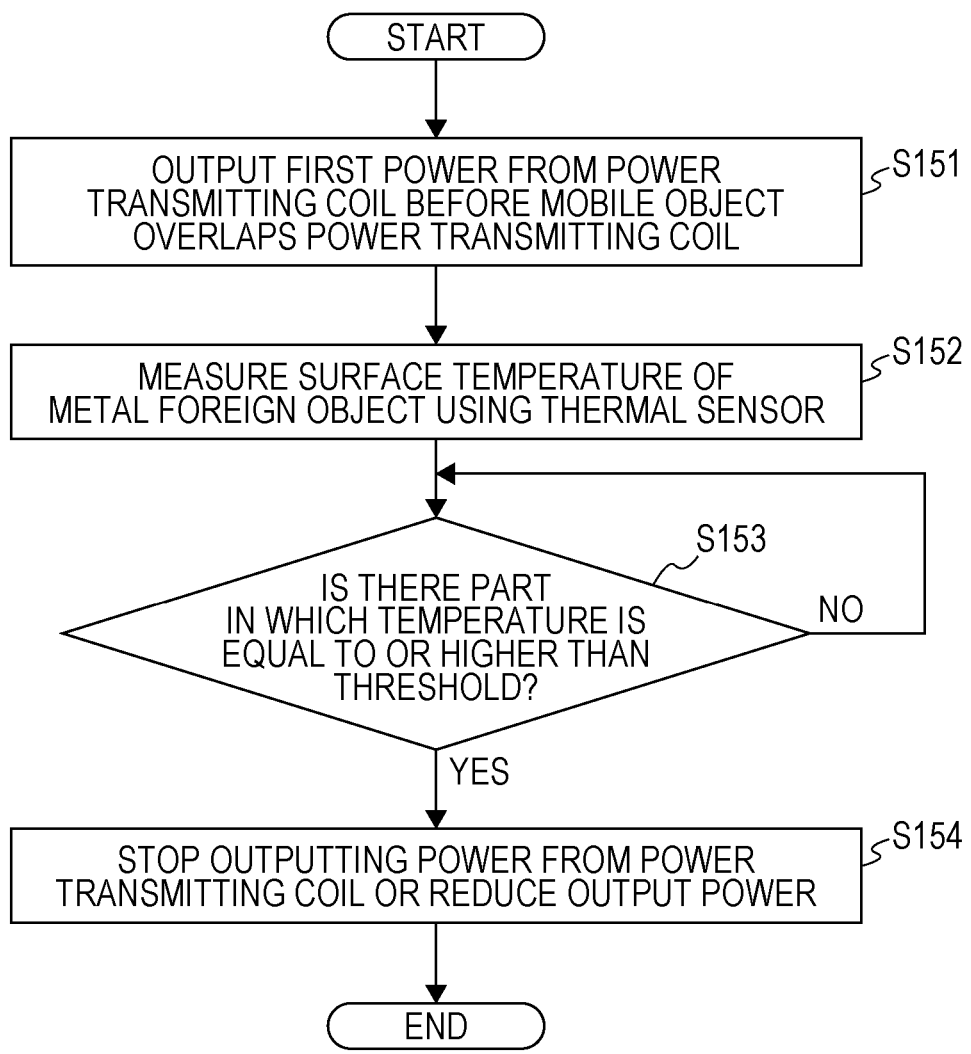

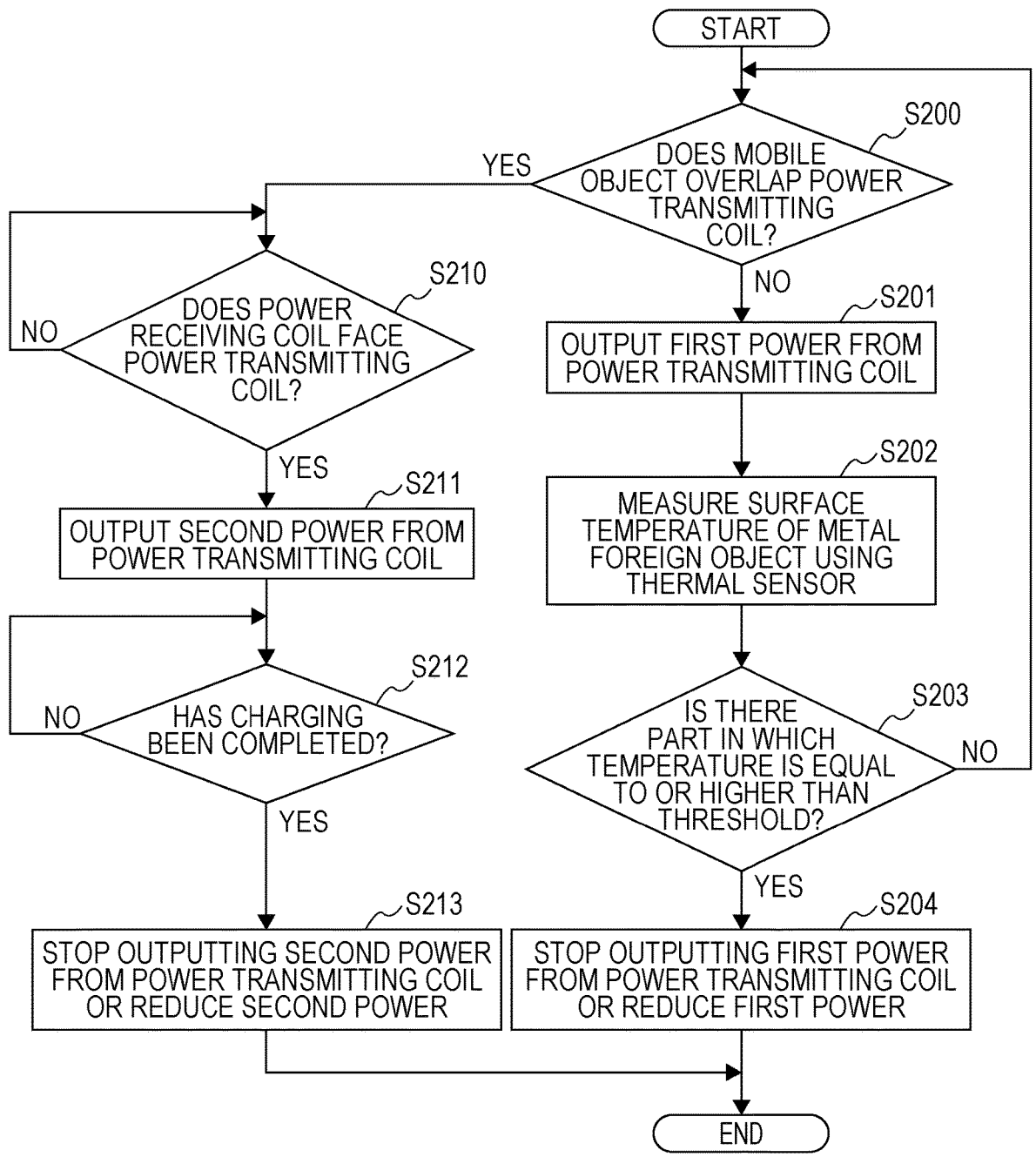

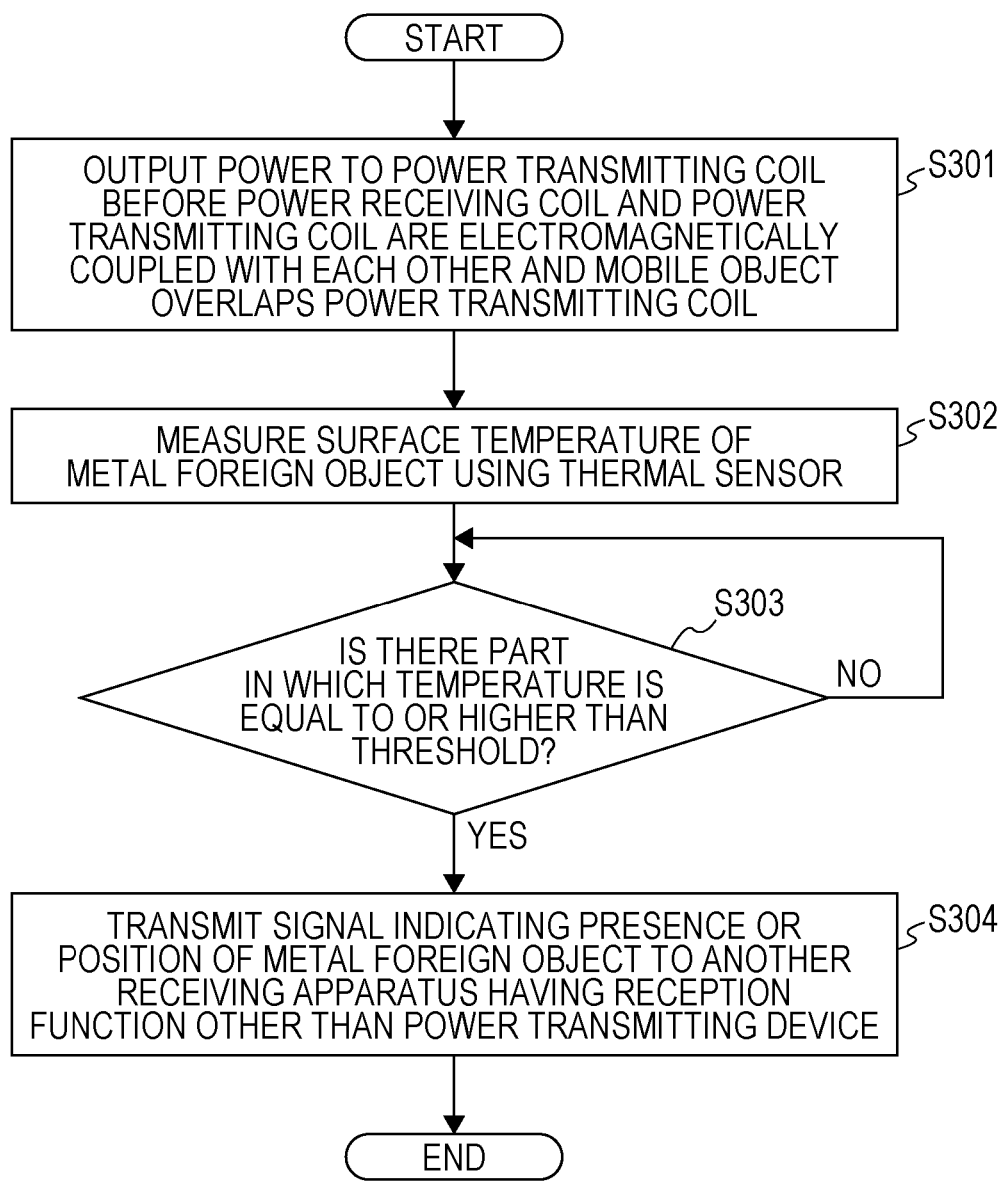

METHOD FOR CONTROLLING POWER TRANSMITTING DEVICE, METHOD FOR DETECTING FOREIGN OBJECT, AND POWER TRANSMITTING DEVICE IN WIRELESS POWER TRANSMISSION SYSTEM

BACKGROUND

1. Technical Field

The present disclosure relates to a method for controlling a power transmitting device, a method for detecting a foreign object, and the power transmitting device in a wireless power transmission system.

2. Description of the Related Art

A wireless power transmission system used for a mobile object such as a vehicle electromagnetically couples a power transmitting coil included in a power transmitting device and a power receiving coil included in a power receiving device with each other and transmits power from the power transmitting coil to the power receiving coil. If there is a metal foreign object such as an empty can or a coin between the power transmitting coil and the power receiving coil, the surface temperature of the metal foreign object increases due to a magnetic field generated by the power transmitting coil during power transmission, which causes a safety concern. In addition, when there is a metal foreign object between the coils, normal wireless charging might not be performed. Various techniques for detecting a metal foreign object have been proposed.

Japanese Unexamined Patent Application Publication No. 2013-192411 discloses a method in which a camera is provided on a bottom surface of a vehicle and the camera detects a metal foreign object with a power transmitting coil and a power receiving coil facing each other. If it is determined that there is a metal foreign object between the power transmitting coil and the power receiving coil, the power transmitting coil stops outputting power to the power receiving coil.

Japanese Unexamined Patent Application Publication No. 2001-275280 discloses a method in which a power receiving terminal transmits, to a main device, information obtained by a secondary voltage detection unit and a secondary current detection unit provided therefor and the main device controls supply of power to the power receiving terminal by determining, on the basis of the information, whether a primary current to a power transmitting oscillation unit is excessive. With this method, even if there is a metal foreign object between a power transmitting side and a power receiving side, an operation for transmitting power can be stopped before the metal foreign object is heated.

SUMMARY

With the methods disclosed in the examples of the related art, a metal foreign object is detected with a power transmitting coil and a power receiving coil facing each other. In such a system, however, a vehicle needs to be moved from a parking position, for example, in order to remove a metal foreign object under the vehicle. One non-limiting and exemplary embodiment provides a novel method that can solve this problem.

In one general aspect, the techniques disclosed here feature a method for detecting a foreign object used to detect a metal foreign object using a power transmission device.

The power transmission device includes
an inverter that generates power;
a power transmitting coil for outputting power to a power receiving coil included in a mobile object;
a thermal sensor that measures a surface temperature of the metal foreign object on the power transmitting coil; and
a power transmission control circuitry that causes the inverter to controls the power output from the power transmitting coil.

The method comprises causing the power transmission control circuitry to:
cause the power transmitting coil to output the power before the power receiving coil and the power transmitting coil are electromagnetically coupled with each other and the mobile object overlaps the power transmitting coil;
cause the thermal sensor to measure the surface temperature of the metal foreign object; and
transmit, if the measured surface temperature of the metal foreign object is equal to or higher than a threshold, a signal indicating presence of the metal foreign object from the power transmitting device to another receiving apparatus, other than the power transmission device, having a function of receiving the signal.

In another aspect, the techniques disclosed here feature a method for detecting and removing a metal foreign object using a power transmission device.

The power transmission device includes
an inverter that generates power;
a power transmitting coil for outputting power to a power receiving coil included in a mobile object;
a thermal sensor that detects a surface temperature of the metal foreign object on the power transmitting coil;
a foreign object removal mechanism; and
a power transmission control circuitry that causes the inverter to controls the power output from the power transmitting coil;

The method comprising causing the power transmission control circuitry to:
cause the power transmitting coil to output the power before the power receiving coil and the power transmitting coil are electromagnetically coupled with each other and the mobile object overlaps the power transmitting coil;
cause the thermal sensor to measure the surface temperature of the metal foreign object; and
causing, if the measured surface temperature of the metal foreign object is equal to or higher than a threshold, the foreign object removal mechanism to perform an operation for removing a foreign object.

It should be noted that general or specific embodiments may be implemented as a system, a method, an integrated circuit, a computer program, a storage medium, or any selective combination thereof.

According to the aspect of the present disclosure, a metal foreign object around a power transmitting coil can be detected before a power receiving coil and the power transmitting coil are electromagnetically coupled with each other and a mobile object including the power receiving coil overlaps the power transmitting coil. As a result, the metal foreign object can be promptly removed, and non-contact power transmission can start normally and promptly.

Additional benefits and advantages of the disclosed embodiments will become apparent from the specification and drawings. The benefits and/or advantages may be individually obtained by the various embodiments and features

BRIEF DESCRIPTION OF THE DRAWINGS

FIG. 9 is a flowchart illustrating a basic procedure of an operation performed by a power transmission control circuitry;

FIG. 10 is a flowchart illustrating a more detailed example of the operation performed by the power transmission control circuitry;

FIG. 18B is a flowchart illustrating a basic operation performed by a power transmission control circuitry according to the second embodiment;

DETAILED DESCRIPTION

Underlying Knowledge Forming Basis of the Present Disclosure

Underlying knowledge forming a basis of the present disclosure will be described before describing embodiments of the present disclosure.

Figure 1:
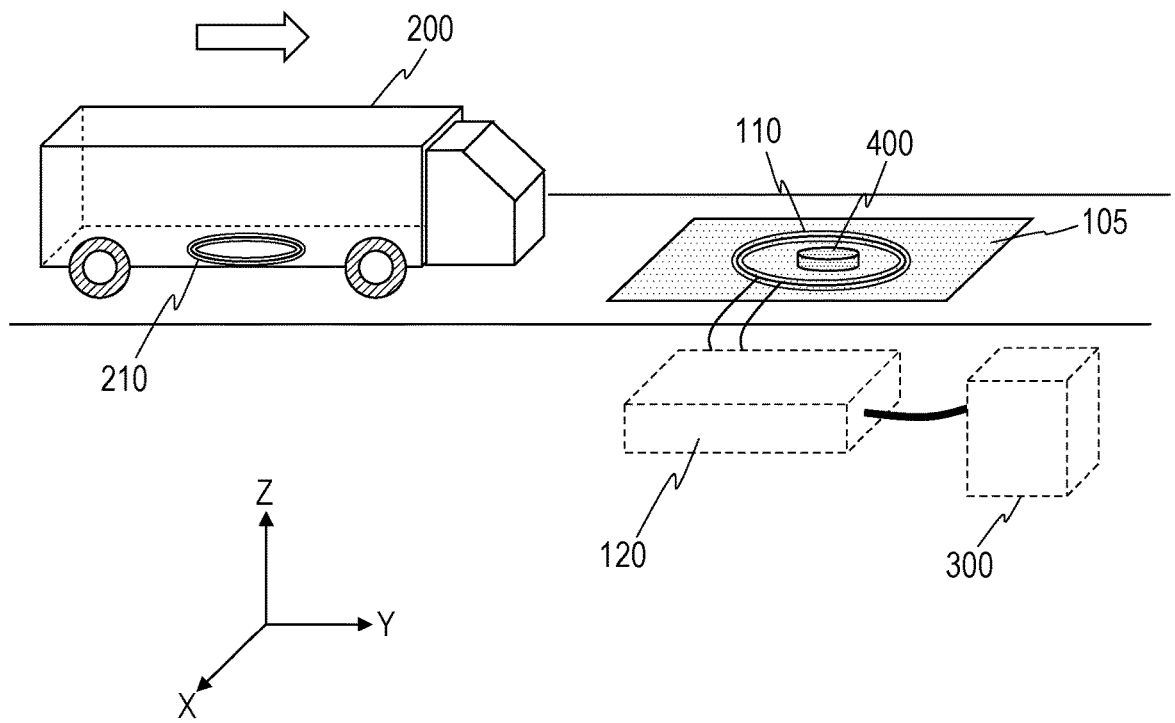
FIG. 1 is a diagram schematically illustrating an example of a wireless power transmission system that wirelessly supplies power to a mobile object.

FIG. 1 is a diagram schematically illustrating an example of a wireless power transmission system that wirelessly supplies power to a mobile object 200. In this wireless power transmission system, a power transmitting coil 110 arranged along a road surface wirelessly transmits power to a power receiving coil 210 arranged on a bottom surface of the mobile object 200. In this example, the mobile object 200 is a vehicle driven by an electric motor. The mobile object 200 can be a vehicle such as a bus, an automobile, a train, or an automated guided vehicle (AGV), but may be a mobile object other than a vehicle.

FIG. 1 illustrates XYZ coordinates indicating X, Y, and Z directions perpendicular to one another. In the following description, the XYZ coordinates illustrated in FIG. 1 will be used. The Y direction is a traveling direction of the mobile object 200, the Z direction is perpendicular to the road surface, and the X direction is perpendicular to the Y and Z directions. Directions of structures illustrated in the drawings of the present disclosure are determined in consideration of the simplicity of description, and do not limit directions used when the embodiments of the present disclosure are actually implemented. In addition, shapes and sizes of some or all of the structures illustrated in the drawings do not limit actual shapes and sizes.

The wireless power transmission system includes a power transmitting device and a power receiving device. The power transmitting device includes a power transmitting circuit 120 that converts power supplied from an external power supply 300 into alternating current power having a frequency and a voltage suitable for power transmission and that outputs the alternating current power, the power transmitting coil 110 connected to the power transmitting circuit 120, and a thermal sensor 130 (refer to FIG. 3), which will be described later. The power transmitting circuit 120 includes components such as an inverter circuit and a power transmission control circuitry, which are not illustrated. The power transmitting circuit 120 and the power supply 300 can be buried under the road surface. The power receiving device is provided for the mobile object 200. The power receiving device includes components such as a rectifier circuit and a power reception control circuitry, which are not illustrated, as well as the power receiving coil 210.

In the wireless power transmission system, power transmission starts after the mobile object 200 moves into a power transmission area 105 in which the power transmitting coil 110 can be electromagnetically coupled with the power receiving coil 210 and the power transmitting coil 110 and the power receiving coil 210 face each other. The power transmission control circuitry included in the power transmitting circuit 120 causes the inverter to generate high-frequency alternating current power, for example, and controls to output the power from the inverter to the power transmitting coil 110. Namely, the power transmission control circuitry causes the inverter to controls the AC power output from the power transmitting coil.

The power transmitting coil 110 generates a magnetic field therearound with the supplied alternating current power. The AC power may be simply referred to as power. The power receiving coil 210 is electromagnetically coupled with the power transmitting coil 110 through the magnetic field and receives at least a part of the transmitted power (energy). The power receiving coil 210 supplies the received power to a load (a secondary battery, etc.) of the mobile object 200 through the rectifier circuit, which is not illustrated. The charging of the mobile object 200 is thus performed.

If there is a metal foreign object 400 on or around the power transmitting coil 110, however, the metal foreign object 400 is heated during power transmission, which causes a safety concern. Various techniques for detecting such a metal foreign object before or during power transmission and preventing heating have been proposed.

Japanese Unexamined Patent Application Publication No. 2013-192411, for example, discloses a system for detecting a metal foreign object using a camera mounted on a bottom surface of a vehicle. In this technique, the camera captures an image of a metal foreign object detection area on an external coil in accordance with a request to start non-contact power transmission. If it is determined on the basis of the captured image that there is no metal foreign object, whether there is a metal foreign object in the metal foreign object detection area is determined during the non-contact power transmission on the basis of a temperature measured by a temperature sensor. In addition, Japanese Unexamined Patent Application Publication No. 2001-275280 discloses a method in which a power receiving terminal transmits information obtained by a secondary voltage detection unit and a secondary current detection unit provided therefor to a main device and the main device controls supply of power to the power receiving terminal by determining whether a primary current to a power transmitting oscillation unit is excessive. With this method, even if there is a metal foreign object between a power transmitting side and a power receiving side, an operation for transmitting power can be stopped before the metal foreign object is abnormally heated. In addition to these techniques, there is a method for detecting a metal foreign object by detecting an increase in a power transmission loss.

In these techniques in the examples of the related art, however, a metal foreign object can be detected only when the power transmitting coil and the power receiving coil face each other. That is, a metal foreign object is detected with the vehicle located on the power transmission coil. It is therefore difficult to remove a metal foreign object without moving the vehicle. In addition, in a system that detects a metal foreign object using a camera as in Japanese Unexamined Patent Application Publication No. 2013-192411, it might be difficult to determine whether a foreign object on the power transmission coil is, say, a copper coin or mud. In addition, it might be difficult for a common camera to detect a metal foreign object when the metal foreign object is covered by dirt or the like.

The present inventors have identified the above problems and examined configurations for solving these problems. The present inventors have then found that a metal foreign object can be detected by performing preliminary power transmission for detecting a metal foreign object before a mobile object reaches a power transmission coil and measuring the temperature of the power transmission coil and temperature around the power transmission coil using a thermal sensor. If a metal foreign object is detected, the metal foreign object can be removed safely and easily by stopping outputting power from the power transmission coil, reducing output power, transmitting a signal indicating the presence of the metal foreign object to an external apparatus, or causing the power transmitting device to perform an operation for removing a foreign object.

The present inventors have conceived the following aspects of the present disclosure on the basis of the above examination.

A method for controlling a power transmitting device according to an aspect of the present disclosure is a method for detecting a metal foreign object using a power transmission device, the power transmission device including:

an inverter that generates power;

a power transmitting coil for outputting power to a power receiving coil included in a mobile object;

a thermal sensor that measures a surface temperature of the metal foreign object on the power transmitting coil; and a power transmission control circuitry that causes the inverter to controls the power output from the power transmitting coil;

the method comprising causing the power transmission control circuitry to:

cause the power transmitting coil to output the power before the power receiving coil and the power transmitting coil are electromagnetically coupled with each other and the mobile object overlaps the power transmitting coil;

cause the thermal sensor to measure the surface temperature of the metal foreign object; and transmit, if the measured surface temperature of the metal foreign object is equal to or higher than a threshold, a signal indicating presence of the metal foreign object from the power transmitting device to another receiving apparatus, other than the power transmitting device, having a function of receiving the signal.

According to the above aspect, the method includes causing the power transmitting coil to output power before the power receiving coil and the power transmitting coil are electromagnetically coupled with each other and a mobile object including the power receiving coil overlaps the power transmitting coil;

causing the thermal sensor to measure the surface temperature of the metal foreign object; and causing, if the measured surface temperature of the metal foreign object is equal to or higher than a threshold, the power transmitting coil to reduce the output power or stop outputting the power.

As a result, a metal foreign object can be detected before the mobile object including the power receiving coil overlaps the power transmitting coil. If a metal foreign object is detected, the power transmitting coil is caused to reduce the output power or stop outputting the power. An increase in the temperature of the metal foreign object, therefore, can be prevented. The metal foreign object can be especially easily removed if power transmission is stopped and the mobile object is stopped before the mobile object overlaps the power transmitting coil.

Foreign matter such as mud or tire tracks is usually left on a cover usually provided on a power transmitting coil, and it is difficult for a common camera to determine whether there is a metal foreign object. In addition, at night or in other dark conditions, it is even more difficult for a common camera to determine whether there is a metal foreign object. According to the above aspect of the present disclosure, the above problems can be solved since a metal foreign object can be certainly detected by intentionally increasing the surface temperature of the metal foreign object.

First power output from the power transmitting coil in order to detect a metal foreign object and second power to be transmitted from the power transmitting coil to the power receiving coil may be different from each other. In an example, the first power is set smaller than the second power. In a system used to charge a small device such as a mobile terminal, power output from a power transmitting coil is only several watts, and a metal foreign object is not abnormally heated even if the power output from the power transmitting coil and power for detecting a metal foreign object are the same. In a system in which a power transmitting coil outputs large power (e.g., several kilowatts to hundreds of kilowatts), such as a system that supplies power to a vehicle, however, the temperature of a metal foreign object sharply increases, which is extremely dangerous. It is therefore effective to set the first power for detecting a metal foreign object smaller than the second power to be transmitted. As a result, the temperature of a metal foreign object does not sharply increase when the metal foreign object is detected. The first power can be set, for example, smaller than one-tenth of the second power. In another example, the first power can be set one-hundredth of the second power.

In general, how much a metal foreign object is heated depends on the material and shape of the metal foreign object and the frequency of power transmitted from the power transmitting coil 110 to the power receiving coil 210. The frequency of the first power and the frequency of the second power are preferably the same. In this case, since a metal foreign object is heated by the first power having the same frequency as the second power before the power transmitting coil 110 transmits the second power to the power receiving coil 210, how much the metal foreign object is heated by the second power can be predicted. When the first power is as large as the second power, too, the frequency of the first power and the frequency of the second power are preferably the same.

A "mobile object" herein is not limited to a vehicle but refers to any mobile object driven by electricity. Mobile objects include, for example, an electric vehicle (EV) including an electric motor and one or more wheels. Such a vehicle can be an AGV such as a carrier robot, an EV, or an electric cart. A "mobile object" herein can also be a mobile object without wheels. Such mobile objects include, for example, a biped robot, an unmanned aerial vehicle (UAV; a so-called "drone") such as a multicopter, and a manned electric aircraft.

Figure 2:
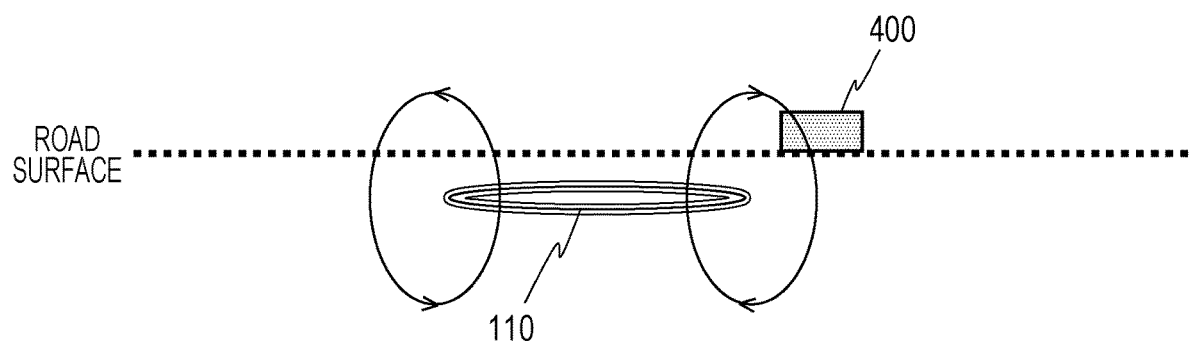
FIG. 2 illustrates an example of a situation in which there is a metal foreign object on a power transmitting coil.

A "metal foreign object on a power transmitting coil" herein refers to a metal foreign object at a position at which the metal foreign object can be heated by a magnetic field generated by the power transmitting coil. FIG. 2, for example, illustrates an example of a situation in which there is a metal foreign object 400 on a power transmitting coil 110. In the example illustrated in FIG. 2, the power transmitting coil 110 is buried under a road surface, and the metal foreign object 400 is located on the road surface. Arrows in FIG. 2 schematically indicate two lines of magnetic force. Even when the metal foreign object 400 is not located directly above the power transmitting coil 110 as in this example, the metal foreign object 400 can be heated by a magnetic field generated by the power transmitting coil 110. An area in which the metal foreign object 400 can be heated expands as output power becomes larger. In the following description, the metal foreign object 400 is regarded as being located on the power transmitting coil 110 insofar as the surface temperature of the metal foreign object 400 increases, even if the metal foreign object 400 is not located directly above the power transmitting coil 110. If there is a metal foreign object 400, an area in which the surface temperature of the metal foreign object 400 increases will be referred to as a "target area".

"A mobile object including a power receiving coil overlaps a power transmitting coil" means that at least a part of a mobile object including a power receiving coil is included in an area facing an area in which a power transmitting coil is provided. When the power transmitting coil is a planar coil and arranged along a flat surface such as a road surface or a wall surface, for example, the mobile object including the power receiving coil is regarded as overlapping the power transmitting coil if the mobile object overlaps the power transmitting coil when viewed in a direction perpendicular to the flat surface.

Figure 3:
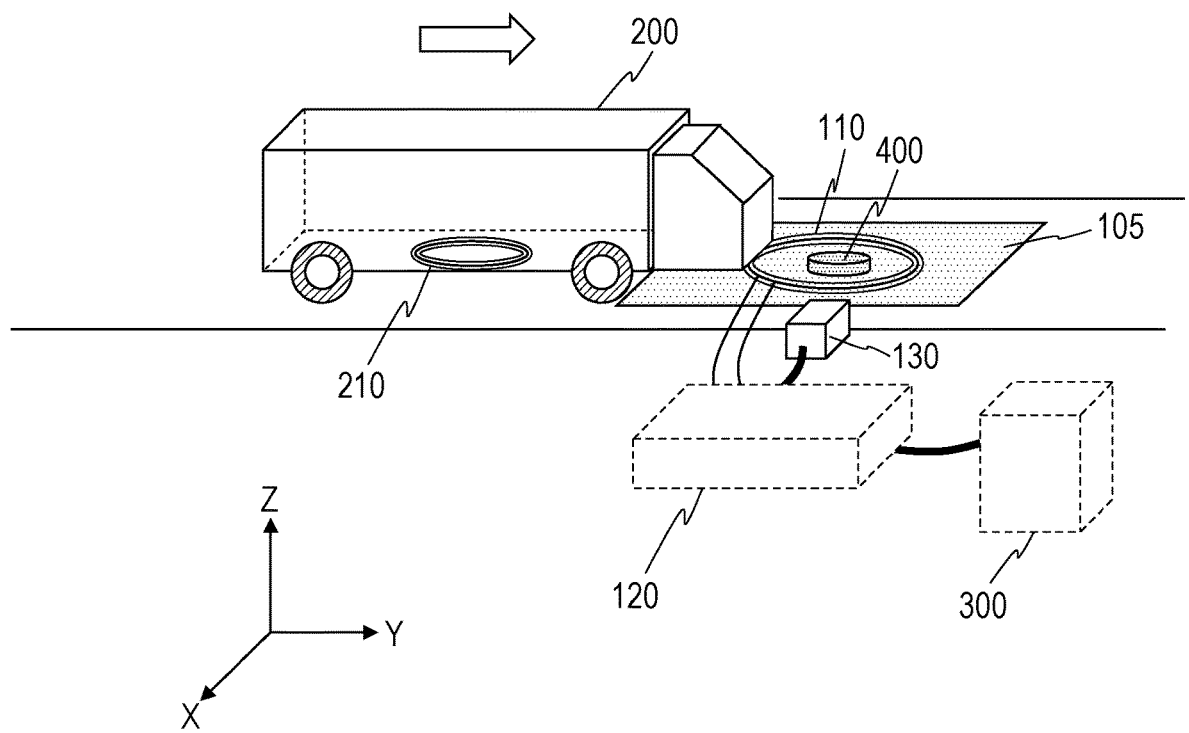
FIG. 3 illustrates an example of a situation in which the mobile object overlaps the power transmitting coil.

FIG. 3 illustrates an example of a situation in which the mobile object 200 overlaps the power transmitting coil 110. In this example, a part (a front end of a vehicle body) of the mobile object 200 is located in an area facing an area in which the power transmitting coil 110 is arranged. In this state, the power receiving coil 210 does not overlap the power transmitting coil 110, but the mobile object 200 overlaps the power transmitting coil 110. In an embodiment of the present disclosure, the power transmitting device intentionally heats the metal foreign object 400 and the thermal sensor 130 detects the metal foreign object 400 before this state is established. If the metal foreign object 400 is detected, the power transmitting device stops outputting power from the power transmitting coil 110 or reduces output power. As a result, the metal foreign object 400 can be removed safely and easily.

Whether the mobile object 200 overlaps the power transmitting coil 110 can be determined using the thermal sensor 130 or another position sensor. In the example illustrated in FIG. 3, the thermal sensor 130 detects not only the metal foreign object 400 but also a position of the mobile object 200. The thermal sensor 130 can be an image sensor that captures an infrared image around the power transmitting coil 110. Presence or absence of the metal foreign object 400 and the position of the mobile object 200 can be detected from the infrared image. The power transmitting device may also include a position sensor that detects the position of the mobile object 200 as well as the thermal sensor 130. The position sensor can be a visible light camera, a distance measuring device that measures a distance between the power transmitting coil 110 and the mobile object 200, or a sensor employing a global positioning system (GPS). Such a sensor is arranged at a position from which the sensor can accurately detect presence or absence of the metal foreign object 400 and the position of the mobile object 200 relative to the power transmitting coil 110.

Figure 4:
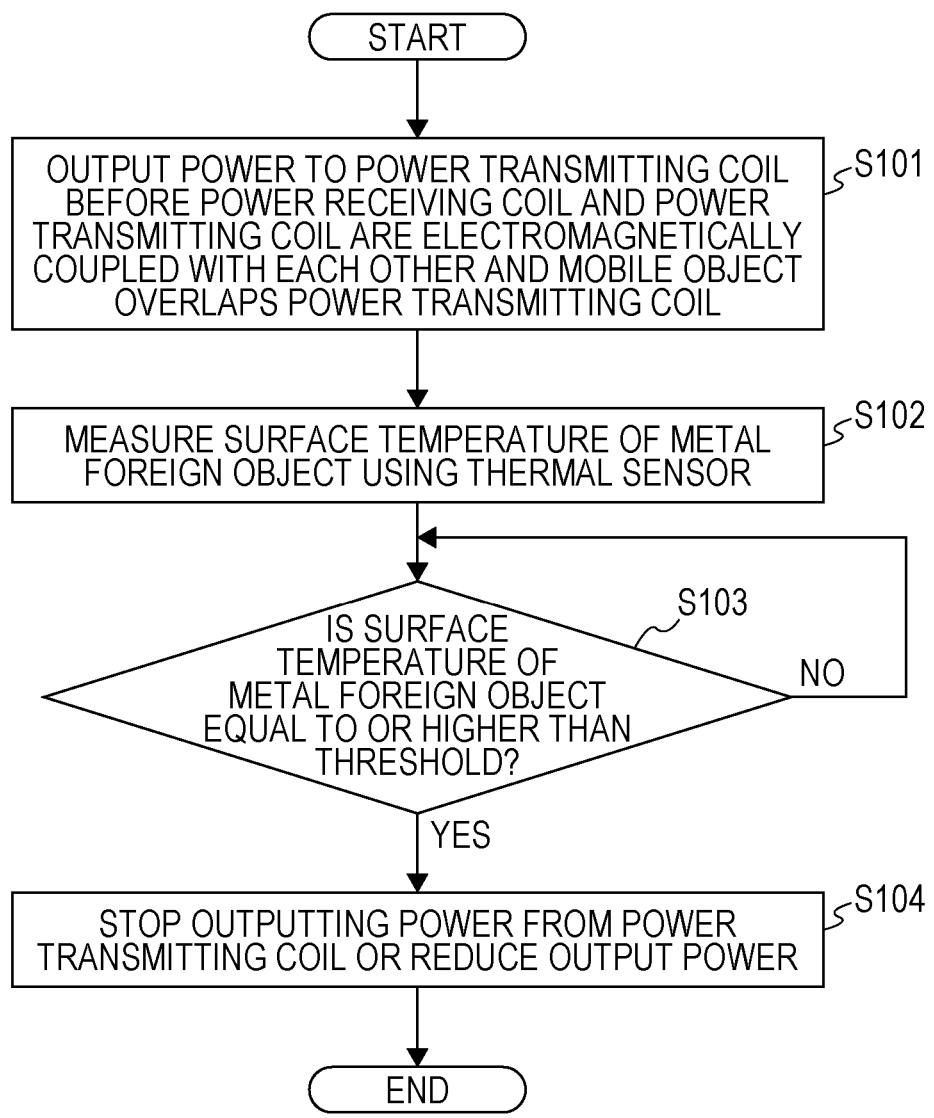
FIG. 4 is a flowchart illustrating a basic operation performed by a power transmitting device in a certain aspect.

FIG. 4 is a flowchart illustrating a basic operation performed by the power transmitting device in the above aspect. The operation is performed by a power transmission control circuitry (included in the power transmitting circuit 120) that controls the operation of the power transmitting device. First, in step S101, the power transmission control circuitry causes the power transmitting coil to output power before the mobile object overlaps the power transmitting coil.

An expression "the power transmitting coil is caused to output power before the mobile object overlaps the power transmitting coil" herein and in the drawings means, as described later, that the power transmitting coil is caused to output power before the mobile object including the power receiving coil reaches a position at which the power receiving coil and the power transmitting coil are electromagnetically coupled with each other and the mobile object overlaps the power transmitting coil. This expression may be used in another aspect.

Next, in step S102, the power transmission control circuitry causes the thermal sensor to measure the surface temperature of the metal foreign object. The measurement can be performed, for example, on the basis of temperature distribution in a target area around the power transmitting coil. If a part of the target area in which temperature exceeds a threshold is detected, it is determined that there is a metal foreign object in the part.

If it is determined in step S103 that the surface temperature of the metal foreign object is equal to or higher than the threshold, the power transmission control circuitry, in step S104, reduces power output from the power transmitting coil or stops outputting power. As a result of the above operation, heating of a metal foreign object can be prevented.

If it is determined in step S103 that the surface temperature of the metal foreign object is lower than the threshold, the power transmission control circuitry executes the operation of step S104 after a predetermined time elapses. The predetermined time is, for example, the time from when the power transmission control circuitry causes the power transmission coil to output the AC power until the power transmission coil overlaps the mobile object.

Although it is determined that there is a metal foreign object if the surface temperature of a metal foreign object is equal to or higher than a threshold in the above aspect, the following method may be used, instead. First, the power transmission control circuitry causes the thermal sensor to measure the surface temperature of the metal foreign object before the mobile object approaches the power transmitting coil. The measured temperature will be referred to as a first measured temperature. Next, the power transmitting circuit causes the power transmitting coil to output power and the thermal sensor to measure the surface temperature of the metal foreign object before the mobile object including the power receiving coil overlaps the power transmitting coil. The measured temperature will be referred to as a second measured temperature. if a difference between the first measured temperature and the second measured temperature is equal to or larger than a threshold, the power transmission control circuitry may determine that there is a metal foreign object.

In another general aspect, the techniques disclosed here feature a method for detecting a foreign object used to detect a metal foreign object using a power transmission device.

The power transmission device includes an inverter that generates power;

a power transmitting coil for outputting power to a power receiving coil included in a mobile object;

a thermal sensor that measures a surface temperature of the metal foreign object on the power transmitting coil; and a power transmission control circuitry that causes the inverter to controls the power output from the power transmitting coil.

The method comprises causing the power transmission control circuitry to:

cause the power transmitting coil to output the power before the power receiving coil and the power transmitting coil are electromagnetically coupled with each other and the mobile object overlaps the power transmitting coil;

cause the thermal sensor to measure the surface temperature of the metal foreign object; and transmit, if the measured surface temperature of the metal foreign object is equal to or higher than a threshold, a signal indicating presence of the metal foreign object from the power transmitting device to another receiving apparatus, other than the power transmitting device, having a function of receiving the signal.

According to the above aspect, in the method, if the measured surface temperature of the metal foreign object is equal to or higher than the threshold, the signal indicating the presence of the metal foreign object is transmitted to the other receiving apparatus, other than the power transmitting device, having the function of receiving the signal. "Another receiving apparatus having a function of receiving the signal" may be referred to as "another device" herein and in the drawings.

As a result, if a metal foreign object is detected, a person concerned can be notified of the presence of the metal foreign object through the other device. The other device to which a signal indicating the presence of a metal foreign object is transmitted can be an information device installed in the mobile object, an information device carried by a user of the mobile object or a caretaker, or a control device that controls the power transmitting device. The other device can be, for example, an automotive navigation system, a smartphone, a tablet computer, a mobile object (e.g., a vehicle or a robot), or a computer (or a controller) mounted on a control device that controls the power transmitting device. The user of the mobile object or the caretaker can notice the presence of the metal foreign object on the basis of the transmitted signal and promptly remove the metal foreign object. When the power transmitting device is installed in a parking lot and controlled by a system in a caretaker's room or a central monitoring room, for example, the other device can be a control device (controller) of the system. The caretaker of the power transmitting device can notice the presence of the metal foreign object on the basis of the transmitted signal and have a sanitation worker remove the metal foreign object.

The signal indicating the presence of the metal foreign object may include information indicating a position of the metal foreign object on the power transmitting coil as well as information indicating presence or absence of a metal foreign object. The position of the metal foreign object can be measured by a thermal sensor or another sensor. If the power transmission control circuitry of the power transmitting device detects a metal foreign object, the power transmission control circuitry may transmit, to the other device such as a smartphone, information indicating a relative positional relationship between the power transmitting coil and the metal foreign object. The apparatus that has received the information may display, on a display, an image indicating the relative positional relationship between the power transmitting coil and the metal foreign object. According to this aspect, a person concerned can easily identify the position of the metal foreign object on the basis of the displayed image and promptly remove the detected metal foreign object.

That is, in the method according to the above aspect, if the measured surface temperature of the metal foreign object is equal to or higher than the threshold, the power transmitting device transmits the signal indicating the presence of the metal foreign object to the other receiving apparatus, other than the power transmitting device, having the function of receiving the signal. The method is performed, for example, by the power transmission control circuitry of the power transmitting device. The method is performed, for example, by the power transmission control circuitry of the power transmitting device included in the wireless power transmission system. The method may be used in another aspect.

Figure 5:
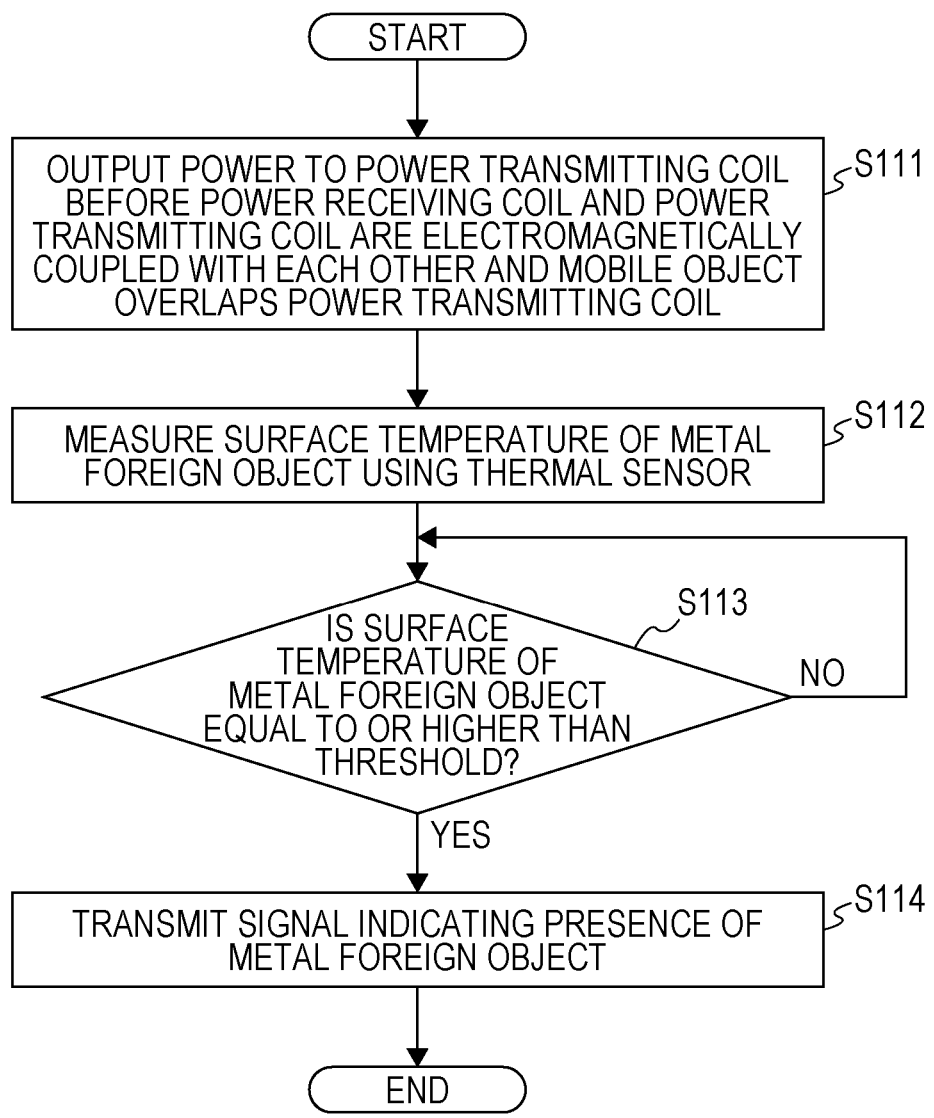
FIG. 5 is a flowchart illustrating a basic operation performed by the power transmitting device in another aspect.

FIG. 5 is a flowchart illustrating a basic operation performed by the power transmitting device according to the present aspect. The operation is performed by the power transmission control circuitry that controls the operation of the power transmitting device. Steps S111 to S113 are the same as steps S101 to S103, respectively, illustrated in FIG. 4. In the example illustrated in FIG. 5, if determining that there is a metal foreign object, the power transmission control circuitry transmits a signal indicating the presence of the metal foreign object to the other device other than the power transmitting device (step S114).

As a result, a person concerned is notified of the presence of the metal foreign object through the other device that has received the signal, and the metal foreign object can be promptly removed.

In the example illustrated in FIG. 5, the operation for stopping outputting power or reducing output power in step S104 illustrated in FIG. 4 may be performed. In this case, both an effect of suppressing heating of a metal foreign object and an effect of notifying a person concerned of presence of a metal foreign object can be produced.

In the embodiments of the present disclosure, a detected foreign object may be removed by a foreign object removal mechanism provided for at least either the power transmitting device or the mobile object. The foreign object removal mechanism refers to any mechanism capable of removing a foreign object around the power transmitting coil. A foreign object can be a foreign object containing metal or a foreign object that does not contain metal. A foreign object containing metal will be referred to as a metal foreign object. The power transmitting device can include a foreign object removal mechanism that lifts a part of the cover of the power transmitting coil to slide off a foreign object. Another example of the foreign object removal mechanism is a mechanism that sweeps away a foreign object with a wiper or a brash provided on the bottom surface of the mobile object (e.g., a vehicle) or for the power transmitting device. In addition, a mechanism that blows away a foreign object by outputting a strong wind using a compressor or a mechanism that sucks in a foreign object with strong suction can be used as the foreign object removal mechanism. Examples of the foreign object removal mechanism are disclosed in Japanese Unexamined Patent Application Publication No. 2013-48511 and Japanese Unexamined Patent Application Publication No. 2013-59239 (or U.S. Patent Application Publication No. 2014/239735). The entire contents of these examples of the related art are incorporated herein by reference.

Figure 6:
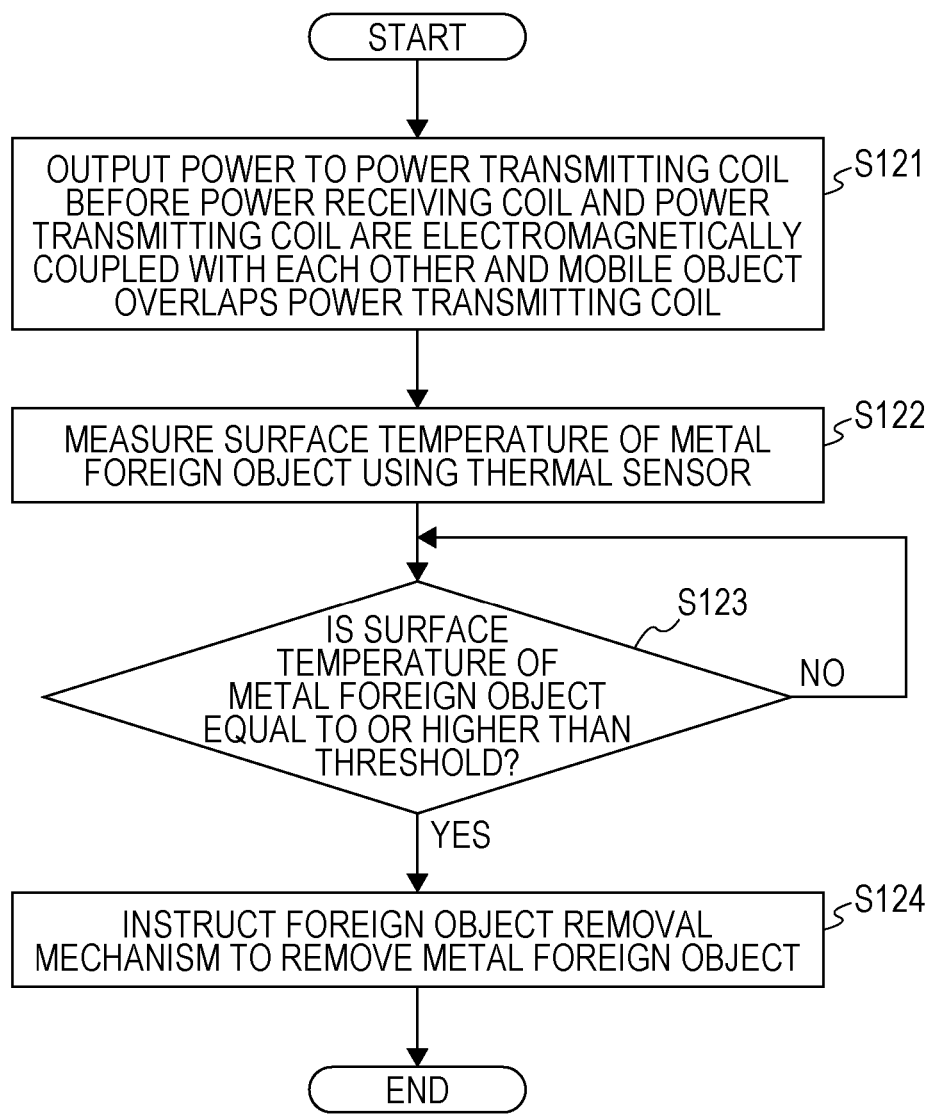
FIG. 6 is a flowchart illustrating an example of an operation for removing a metal foreign object performed by a foreign object removal mechanism included in at least either the power transmitting device or the mobile object.

FIG. 6 is a flowchart illustrating an example of an operation for removing a metal foreign object performed by the foreign object removal mechanism included in at least either the power transmitting device or the mobile object. Steps S121 to S123 illustrated in FIG. 6 are the same as steps S101 to S103, respectively, illustrated in FIG. 4. In the example illustrated in FIG. 6, if a metal foreign object is detected, the power transmission control circuitry causes the foreign object removal mechanism of the power transmitting device and/or the foreign object removal mechanism of the mobile object to perform the operation for removing a foreign object (step S124). As a result, the metal foreign object can be promptly removed.

More specific embodiments of the present disclosure will be described hereinafter. Unnecessarily detailed description, however, might be omitted. For example, detailed description of well-known elements and redundant description of substantially the same components might be omitted in order to avoid redundancy and facilitate understanding. The present inventors provide the following description and the accompanying drawings in order for those skilled in the art to fully understand the present disclosure, not in order to limit a subject matter described in the claims. In the following description, the same or similar components are given the same reference numerals.

First Embodiment

Figure 7:
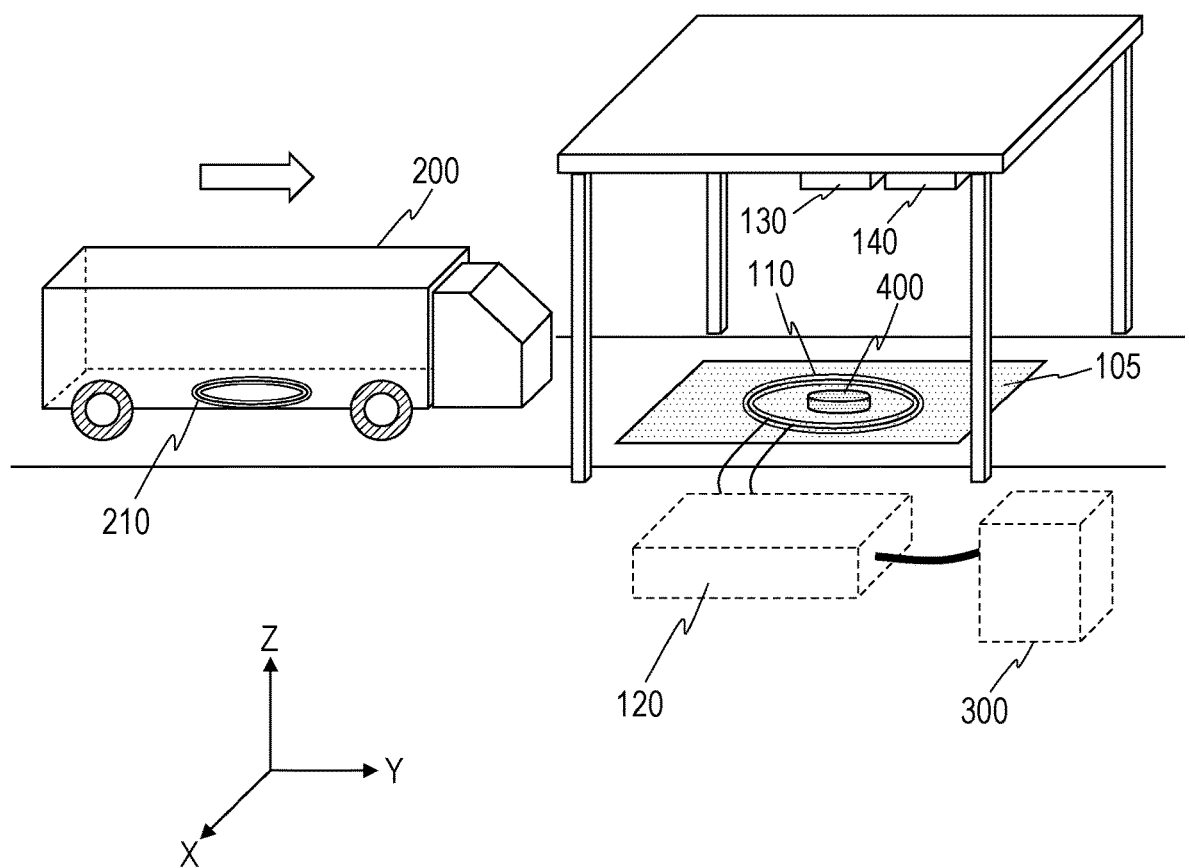
FIG. 7 is a perspective view schematically illustrating the configuration of a wireless power transmission system according to a first exemplary embodiment of the present disclosure.

FIG. 7 is a perspective view schematically illustrating the configuration of a wireless power transmission system according to a first exemplary embodiment of the present disclosure. The wireless power transmission system is used to supply power to an electric car, for example, on a road or in a parking lot. The wireless power transmission system includes a power transmitting device and a mobile object 200. The power transmitting device includes a power transmitting circuit 120, a power transmitting coil 110, a thermal sensor 130, and a position sensor 140. In the present embodiment, the thermal sensor 130 and the position sensor 140 are arranged above a power transmission area 105 (under a roof). The thermal sensor 130 and the power transmitting circuit 120, and the position sensor 140 and the power transmitting circuit 120, are wirelessly connected to each other. The power transmitting device can thus be an aggregation of a plurality of spatially separate components. Alternatively, the thermal sensor 130 and the power transmitting circuit 120, and the position sensor 140 and the power transmitting circuit 120, may be connected by wire.

The mobile object 200 is a vehicle such as a bus, for example, and includes a power receiving coil 210 on a bottom surface thereof.

Figure 8:
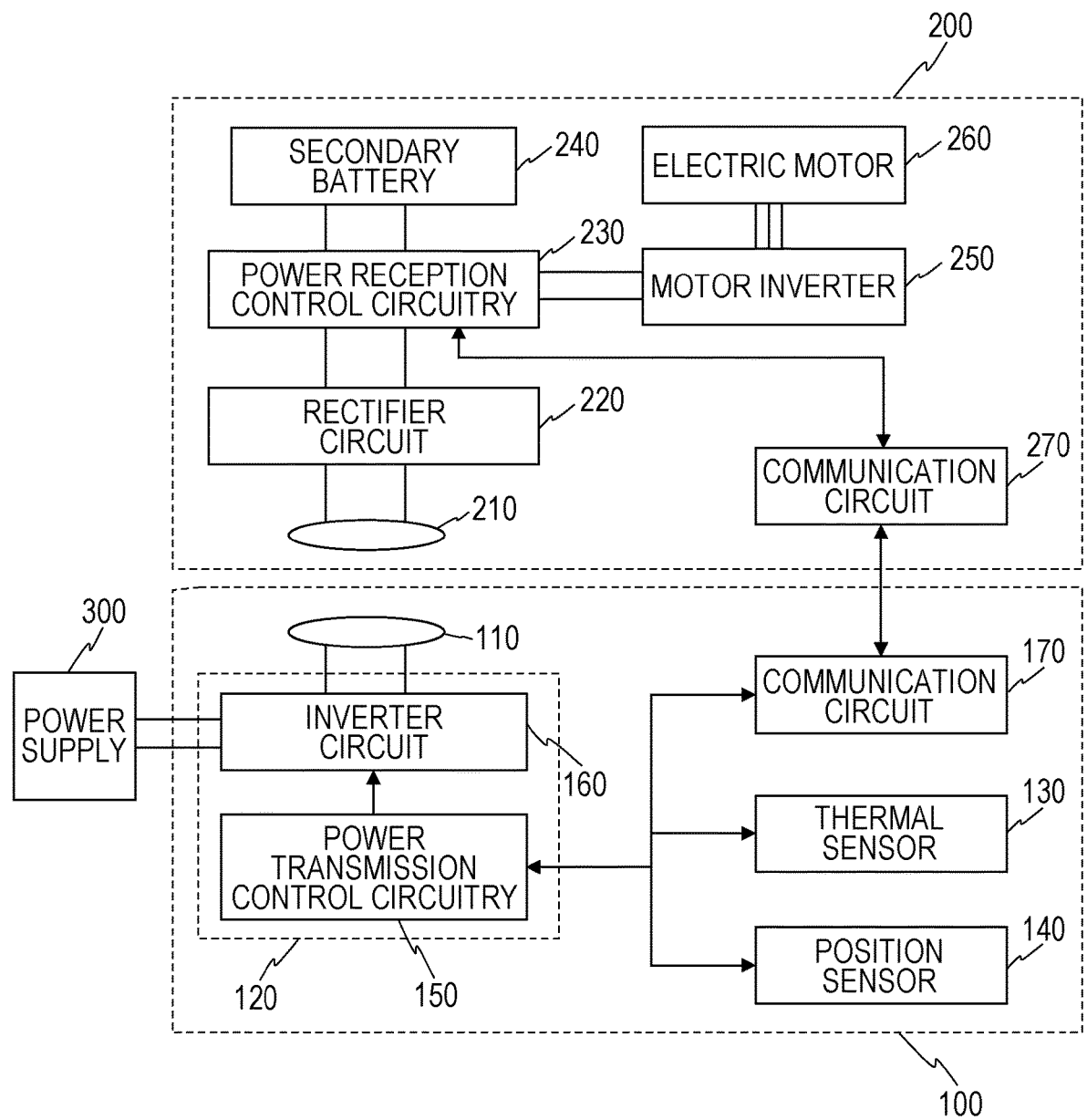
FIG. 8 is a block diagram illustrating the configuration of the wireless power transmission system according to the first embodiment.

FIG. 8 is a block diagram illustrating the configuration of the wireless power transmission system according to the present embodiment. A power transmitting device 100 includes a communication circuit 170 as well as the power transmitting coil 110, the power transmitting circuit 120, the thermal sensor 130, and the position sensor 140. The power transmitting circuit 120 includes an inverter circuit 160 and a power transmission control circuitry 150. The inverter circuit 160 is connected between an external power supply 300 and the power transmitting coil 110. The inverter circuit 160 converts direct current power supplied from the power supply 300 into alternating current power and supplies the alternating current power to the power transmitting coil 110. The power transmission control circuitry 150 controls the inverter circuit 160, the communication circuit 170, the thermal sensor 130, and the position sensor 140. The power transmission control circuitry 150 controls on/off states of a plurality of switching devices of the inverter circuit 160, for example, such that the inverter circuit 160 outputs alternating current power having a desired frequency and a desired voltage. The communication circuit 170 communicates signals with a communication circuit 270 of the mobile object 200. The thermal sensor 130 detects a metal foreign object around the power transmitting coil 110. The position sensor 140 measures a position of a metal foreign object and a position of the mobile object 200.

The mobile object 200 includes the power receiving coil 210, a rectifier circuit 220, a power reception control circuitry 230, a secondary battery 240, the communication circuit 270, an electric motor 260, and a motor inverter 250. The rectifier circuit 220, which is connected to the power receiving coil 210, converts alternating current power output from the power receiving coil 210 into direct current power and outputs the direct current power. The electric motor 260 drives the mobile object 200 and is driven by three-phase alternating current power. The motor inverter 250 converts supplied direct current power into three-phase alternating current power and supplies the three-phase alternating current power to the electric motor 260. The power reception control circuitry 230 charges the secondary battery 240 with the direct current power output from the rectifier circuit 220 and controls the motor inverter 250 and the communication circuit 270.

Before the secondary battery 240 runs out, the mobile object 200 according to the present embodiment approaches the power transmission area 105 in which the power transmitting coil 110 is arranged in order to charge the secondary battery 240. If a metal foreign object 400 is not detected around the power transmitting coil 110, the power transmission control circuitry 150 drives the inverter circuit 160 to transmit power. Power transmitted through magnetic field coupling between the power transmitting coil 110 and the power receiving coil 210 is stored in the secondary battery 240. After the secondary battery 240 is charged, the mobile object 200 begins to run again by driving the electric motor 260 using the power stored in the secondary battery 240.

If the metal foreign object 400 is located around the power transmitting coil 110 as illustrated in FIG. 7, however, the metal foreign object 400 is heated, which is dangerous. The power transmitting device 100 according to the present embodiment, therefore, detects the metal foreign object 400 using the thermal sensor 130 before the mobile object 200 reaches the power transmitting coil 110. After the metal foreign object 400 is detected, the power transmitting coil 110 stops outputting power or reduces output power.

The thermal sensor 130 is achieved, for example, by the same configuration as that of an infrared camera. The thermal sensor 130 measures the temperature of a target area by detecting the amount of infrared light radiated from a target using, for example, one or a plurality of detectors having sensitivity to infrared light. This measurement method used by the thermal sensor 130 is also called "infrared thermography". If the thermal sensor 130 is a single detector (e.g., a photodiode), the thermal sensor 130 measures the entirety of the target. It is preferable that the thermal sensor 130 is achieved by a two-dimensional image sensor such as a charge-coupled device (CCD) or a complementary metal-oxide-semiconductor (CMOS), because the temperature distribution of the target can be measured in two dimensions.

In the example illustrated in FIG. 7, information regarding a temperature measured by the thermal sensor 130 is wirelessly transmitted to the power transmission control circuitry 150.

In the present embodiment, the position sensor 140 is provided in addition to the thermal sensor 130. The position sensor 140 measures the position of the mobile object 200 using light, radio waves, pressure, sound waves, or the like. The position sensor 140 may be a distance measuring device such as a common image sensor or a time-of-flight (TOF) sensor. The position sensor 140 may be a pressure-sensitive sensor. Such a pressure-sensitive sensor can be arranged along a route of the mobile object 200. Although the position sensor 140 is arranged independently of the thermal sensor 130 in the present embodiment, the position sensor 140 and the thermal sensor 130 may be achieved by a single sensor, instead. For example, the thermal sensor 130 may have the function of the position sensor 140.

The operation according to the present embodiment will be described in more detail hereinafter with reference to FIG. 9.

FIG. 9 is a flowchart illustrating a basic procedure of an operation performed by the power transmission control circuitry 150. Before the mobile object 200 overlaps the power transmitting coil 110, the power transmission control circuitry 150 causes the power transmitting coil 110 to output small power (first power) (step S151). Next, the power transmission control circuitry 150 causes the thermal sensor 130 to measure the temperature of a target area including the power transmitting coil 110 (step S152). Step S152 is the same operation as Step 102, illustrated in FIG. 4. If there is a part of the target area in which temperature is equal to or higher than a certain threshold, it can be determined that there is a metal foreign object 400 in that part (step S153). The threshold can be set at a value equal to or higher than 50° C. but equal to or lower than 100° C. For example, the threshold can be set at 60° C., 70° C., 80° C., or 90° C. Alternatively, presence or absence of a metal foreign object 400 may be determined on the basis of a change in surface temperature before and after power transmission. In this case, the amount of change (e.g., 10° C.) serves as the threshold. If determining that there is a metal foreign object 400, the power transmission control circuitry 150 stops outputting the power (first power) from the power transmitting coil 110 or reduces the power output from the power transmitting coil 110 by stopping controlling the inverter circuit 160 or changing timings of switching (step S154).

In step S151, whether the mobile object 200 overlaps the power transmitting coil 110 is determined. The determination is made on the basis of an output of the position sensor 140. The power transmission control circuitry 150 constantly monitors a relative positional relationship between the power transmitting coil 110 and the mobile object 200 on the basis of the output of the position sensor 140. If determining that a distance between the mobile object 200 and the power transmitting coil 110 has become smaller than a certain value, the power transmission control circuitry 150 causes the inverter circuit 160 output the first power from the power transmitting coil 110. As a result, the thermal sensor 130 can detect the metal foreign object 400.

FIG. 10 is a flowchart illustrating a more detailed example of the operation performed by the power transmission control circuitry 150. The power transmission control circuitry 150 determines whether the mobile object 200 overlaps the power transmitting coil 110 on the basis of the output of the position sensor 140 (step S200). The expression "determines whether the mobile object 200 overlaps the power transmitting coil 110" means that whether the mobile object 200 overlaps the power transmitting coil 110 before the power receiving coil 210 and the power transmitting coil 110 are electromagnetically coupled with each other is determined. If not, the power transmission control circuitry 150 cause the power transmitting coil 110 to output the first power as described above (step S201). Next, the power transmission control circuitry 150 causes the thermal sensor 130 to measure the temperature of a target area of the power transmitting coil 110 (step S202). The power transmission control circuitry 150 then determines whether there is a part of the target area in which temperature is equal to or higher than the threshold (step S203). If so, the power transmission control circuitry 150 stops outputting the first power from the power transmitting coil 110 or reduces the first power (step S204). If a result of the determination in step S203 is negative, the process returns to step S200, and steps S200 to S203 are repeated until the mobile object 200 including the power receiving coil 210 overlaps the power transmitting coil 110 or until a metal foreign object 400 is detected. A metal foreign object 400 may be detected regularly or irregularly.

If determining in step S200 that the mobile object 200 overlaps the power transmitting coil 110, the power transmission control circuitry 150 determines whether the power receiving coil 210 faces the power transmitting coil 110 (step S210). If so, the power transmission control circuitry 150 causes the power transmitting coil 110 to output second power (step S211). Charging thus starts. As described above, the second power is larger than the first power for detecting a metal foreign object 400. The second power can be set at a value, for example, ten or more times larger than the first power, or one hundred or more times larger than the first power in some cases. The second power can be set within a range of several tens kilowatts to several hundreds of kilowatts. The first power, on the other hand, can be set within a range of tens of watts to several kilowatts. After the charging is completed in step S212, the power transmission control circuitry 150 causes the power transmitting coil 110 to stop outputting the second power by stopping controlling the inverter circuit 160 (step S213). As a result of the above operation, the charging of the mobile object 200 is completed.

As described above, if the surface temperature of a metal foreign object 400 detected by the thermal sensor 130 is equal to or higher than the threshold, the power transmission control circuitry 150 causes the power transmitting coil 110 to stop outputting power or reduce output power in the present embodiment. In addition, if a metal foreign object 400 is not detected and the mobile object 200 has moved to a position at which the power receiving coil 210 can be electromagnetically coupled with the power transmitting coil 110, the power transmission control circuitry 150 causes the power transmitting coil 110 to output the second power. As a result of this operation, a metal foreign object 400 can be detected and safely removed before power is transmitted to the mobile object 200.

That is, in a control method according to the present embodiment, a power transmitting coil is caused to output power before a mobile object including a power receiving coil moves to a position at which the power receiving coil and the power transmitting coil can be electromagnetically coupled with each other and the mobile object overlaps the power transmitting coil, and a thermal sensor is caused to measure a surface temperature of a metal foreign object, and if the measured surface temperature of the metal foreign object is equal to or higher than a threshold, the power transmitting coil is caused to reduce output power or stop outputting power.

The control method is used, for example, by a power transmission control circuitry included in the power transmitting device. The control method is used, for example, by the power transmission control circuitry of the power transmitting device included in a wireless power transmission system. The control method may be applied to another embodiment.

Next, the components according to the present embodiment will be described in more detail.

Figure 11A:
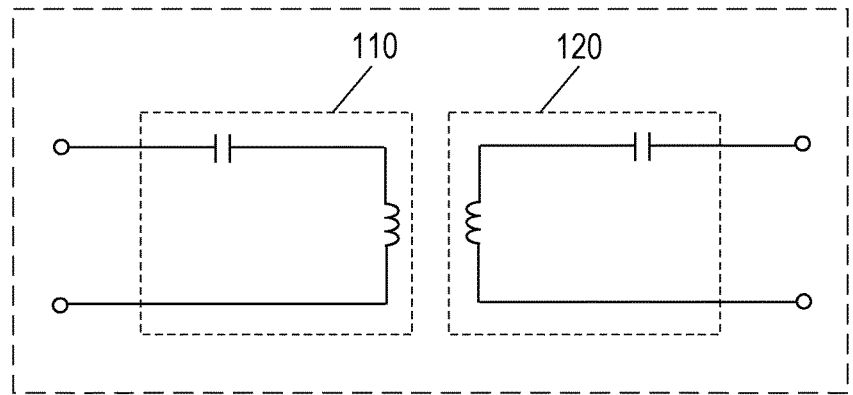
FIG. 11A is a diagram illustrating an example of equivalent circuits of a power transmitting coil and a power receiving coil.

FIG. 11A is a diagram illustrating an example of equivalent circuits of the power transmitting coil 110 and the power receiving coil 210. As illustrated in FIG. 11A, the coils 110 and 120 function as resonant circuits including an inductance component and a capacitance component. When resonant frequencies of the coils 110 and 120 are close to each other, power can be efficiently transmitted. The inverter circuit 160 supplies alternating current power to the power transmitting coil 110. A magnetic field is generated by the power transmitting coil 110 due to the alternating current power, and power is transmitted to the power receiving coil 210 through the magnetic field. In this example, both the power transmitting coil 110 and the power receiving coil 210 function as a series resonant circuit.

Figure 11B:
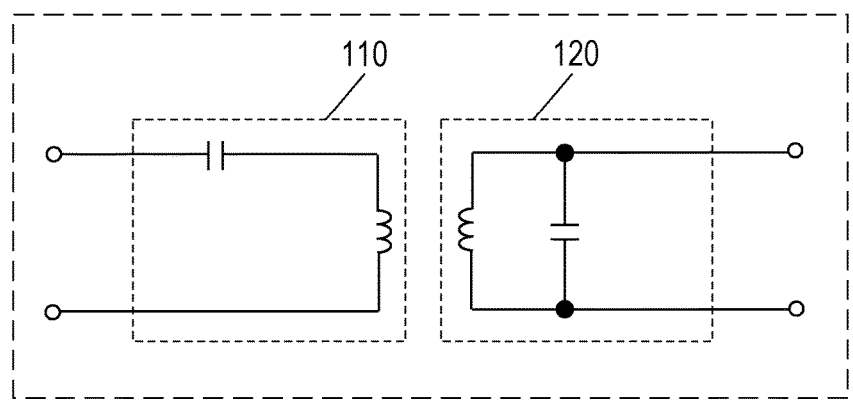
FIG. 11B is a diagram illustrating another example of equivalent circuits of the power transmitting coil and the power receiving coil.

FIG. 11B is a diagram illustrating another example of the equivalent circuits of the power transmitting coil 110 and the power receiving coil 210. In this example, the power transmitting coil 110 functions a series resonant circuit, and the power receiving coil 210 functions as a parallel resonant circuit. In a yet another example, the power transmitting coil 110 can function as a parallel resonant circuit, and the power receiving coil 210 can function as a series resonant circuit.

Each coil can be a planar coil or a multilayer coil or can be a winding coil made of copper wire, Litz wire, twisted wire, or the like. The capacitance component of each resonant circuit may be achieved by the parasitic capacitance of a coil, or a capacitor having a chip shape or a lead shape, for example, may be separately provided.

A resonant frequency f0 of each resonant circuit is set at a transmission frequency f for power transmission. The resonant frequency f0 of each resonant circuit need not strictly match the transmission frequency f. The resonant frequency f0 of each resonant circuit may be set within a range of 50% to 150%, for example, of the transmission frequency f. The transmission frequency f can be set within a range of 50 Hz to 300 GHz, preferably within a range of 20 kHz to 10 GHz, more preferably within a range of 20 kHz to 20 MHz, even more preferably within a range of 20 kHz to 7 MHz.

Although resonant circuits are used in the present embodiment, an inductive coupling method that does not employ resonance or a method employing microwaves may be used, instead.

Figure 12:
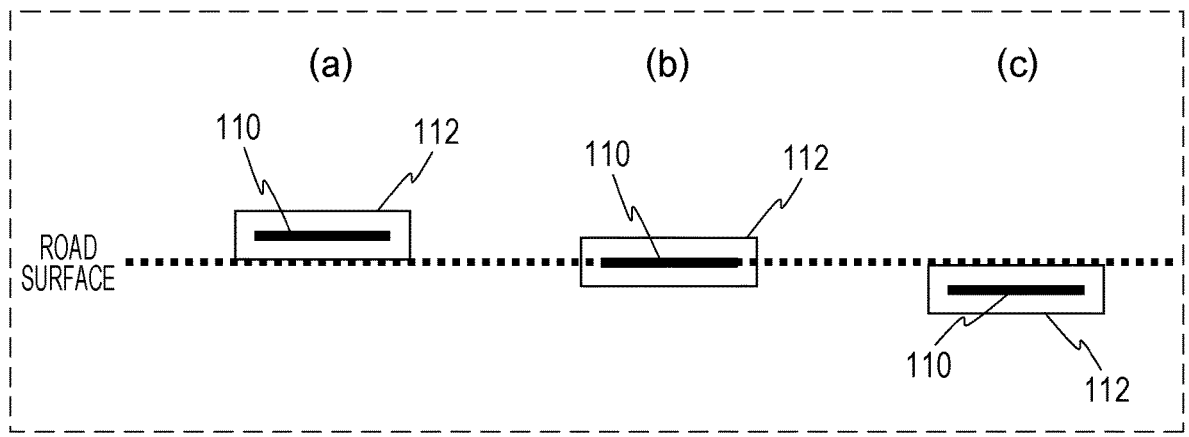
FIG. 12 is a diagram illustrating variations of the arrangement of the power transmitting coil.

FIG. 12 is a diagram illustrating variations of the arrangement of a surface (upper surface) of the power transmitting coil 110. FIG. 12 illustrates three variations. In every variation, the power transmitting coil 110 is covered by a cover member 112 made of, for example, resin. In the variation indicated by FIG. 12(a), the surface of the power transmitting coil 110 is above a road surface. In the variation indicated by FIG. 12(b), the surface of the power transmitting coil 110 is substantially aligned with the road surface.

In the variation indicated by FIG. 12(c), the surface of the power transmitting coil 110 is below the road surface. The surface of the power transmitting coil 110 may be arranged in any of these manners. In addition, a surface of the cover member 112 made of resin may be arranged above or below the road surface or may be substantially aligned with the road surface.

Although the power transmitting coil 110 is arranged along the road surface in the present embodiment, the power transmitting coil 110 may be arranged along a surface (e.g., a wall surface) other than the road surface, instead.

Figure 13A:
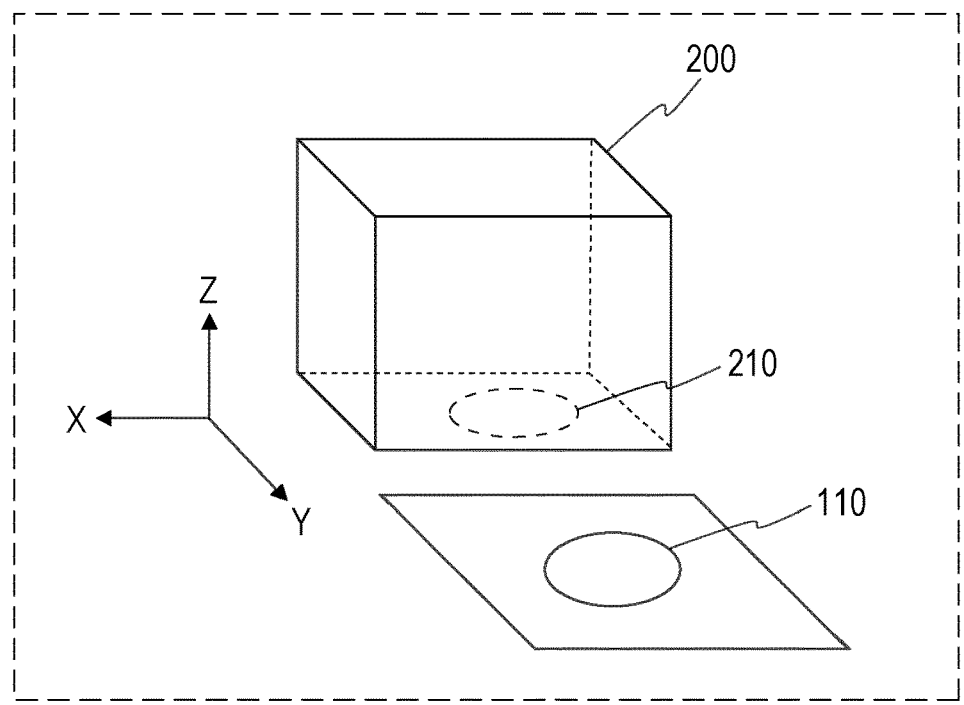
FIG. 13A illustrates an example in which the power transmitting coil is arranged along a road surface.
Figure 13B:
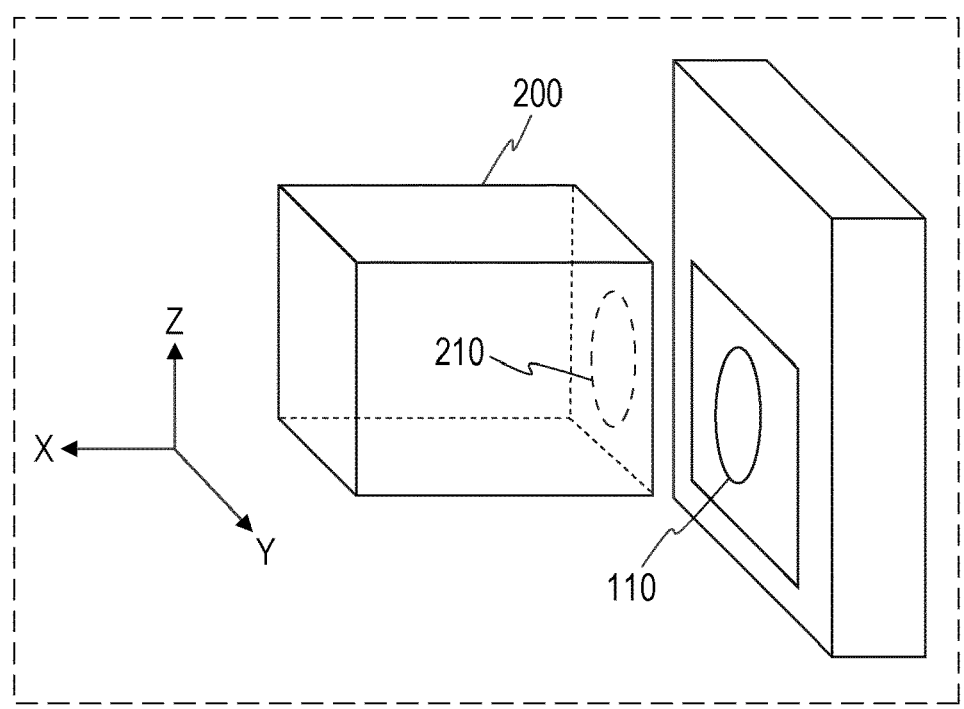
FIG. 13B illustrates an example in which the power transmitting coil is arranged on a wall surface perpendicular to the road surface.

FIGS. 13A and 13B are diagrams illustrating examples of the arrangement of the power transmitting coil 110 and the power receiving coil 210. FIG. 13A illustrates an example in which the power transmitting coil 110 is arranged along the road surface. Such a configuration is suitable when, as in the present embodiment, power is supplied to a vehicle such as an electric car including the power receiving coil 210 on a bottom surface thereof. FIG. 13B illustrates an example in which the power transmitting coil 110 is arranged on a wall surface that intersects (perpendicular in the illustrated example) with the road surface. In this example, the power receiving coil 210 can be provided on a surface (e.g., a side surface of the mobile object 200) that intersects with the wall surface. That is, the power transmitting coil 110 and the power receiving coil 210 need not be arranged parallel to the road surface.

Figure 14:
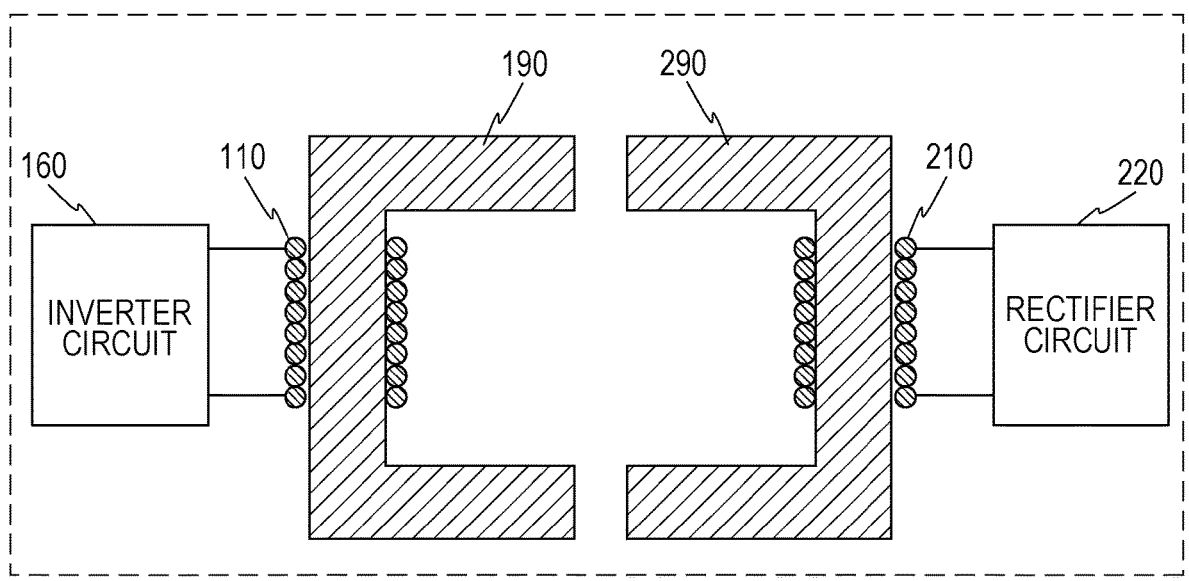
FIG. 14 is a diagram schematically illustrating another example of the power transmitting coil and the power receiving coil.

FIG. 14 is a diagram schematically illustrating another example of the power transmitting coil 110 and the power receiving coil 210. In this example, the power transmitting coil 110 and the power receiving coil 210 are wires wound around magnetic members 190 and 290, respectively. The two magnetic members 190 and 290 have symmetric shapes, and surfaces of two ends of the magnetic members 190 and 290 face each other. With this configuration, too, power transmission employing inductive coupling (magnetic field coupling) can be performed. Alternatively, the two magnetic members 190 and 290 may have asymmetric shapes.

Figure 15A:
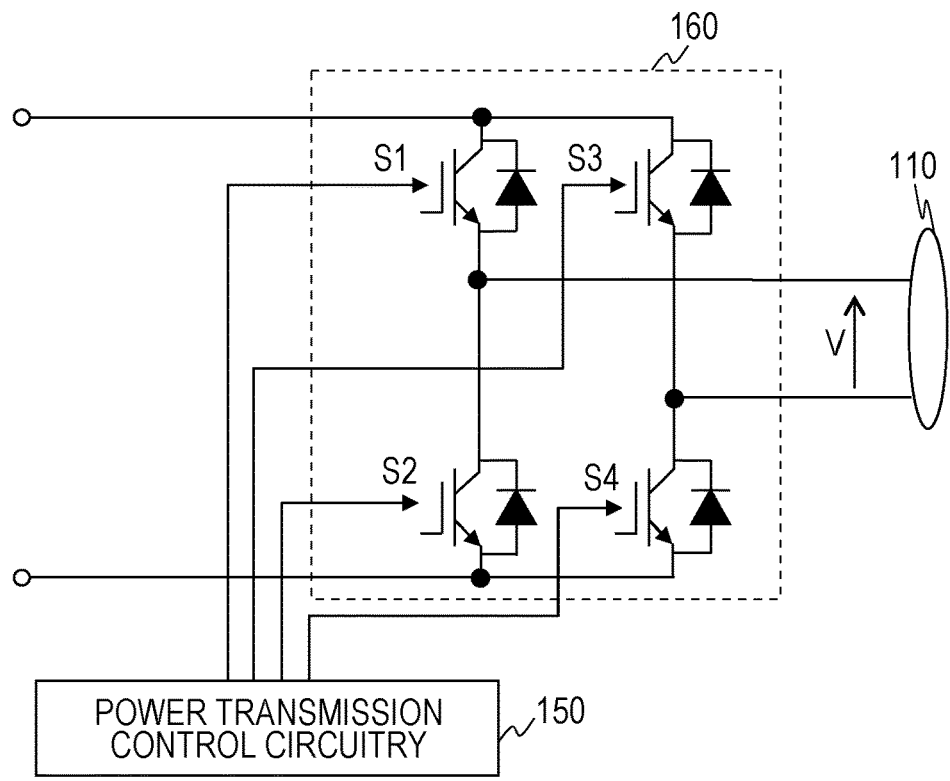
FIG. 15A illustrates an example of the configuration of a full-bridge inverter circuit.
Figure 15B:
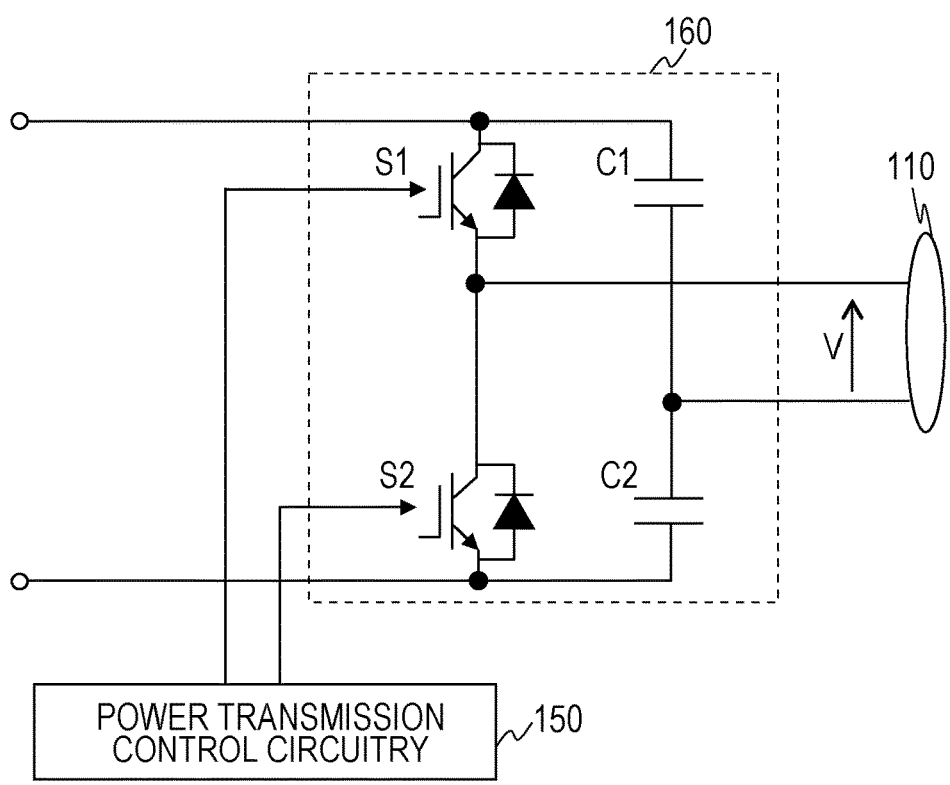
FIG. 15B illustrates an example of the configuration of a half-bridge inverter circuit.

FIGS. 15A and 15B are diagrams illustrating examples of the configuration of the inverter circuit 160. FIG. 15A illustrates an example of the configuration of a full-bridge inverter circuit 160. In this example, the power transmission control circuitry 150 converts input direct current power into alternating current power having a desired frequency f and a desired voltage V (effective value) by turning on or off four switching elements S1 to S4 included in the inverter circuit 160. FIG. 15B illustrates an example of the configuration of a half-bridge inverter circuit 160. In this example, the power transmission control circuitry 150 converts input direct current power into alternating current power having the desired frequency f and the desired voltage V (effective value) by turning on or off two switching elements S1 and S2 included in the inverter circuit 160. The inverter circuit 160 may have a configuration different from those illustrated in FIGS. 15A and 15B, instead. For example, a Class E resonant circuit may be used.

The power transmission control circuitry 150 and the power reception control circuitry 230 can each be achieved by a circuit including a processor and a memory, such as a microcontroller unit (MCU). By executing computer programs stored in the memory, various types of control can be performed. The power transmission control circuitry 150 and the power reception control circuitry 230 may each be achieved by dedicated hardware configured to perform the operation according to the present embodiment.

The communication circuits 170 and 270 can communicate signals using, for example, a known wireless communication technique, optical communication technique, or modulation technique (frequency modulation, amplitude modulation, etc.). The communication circuits 170 and 270 may use any communication method.

The electric motor 260 can be a motor driven by three-phase alternating current power, such as a permanent magnet synchronous motor or an induction motor. The electric motor 260 may be a motor of another type, such as a direct current motor. In this case, a motor driving circuit according to the configuration of the electric motor 260 is used instead of the motor inverter 250, which is a three-phase inverter circuit.

The power supply 300 can be any power supply that outputs direct current power. The power supply 300 may be any power supply such as a commercial power supply, a primary battery, a secondary battery, a solar cell, a fuel cell, a universal serial bus (USB) power supply, a high-capacity capacitor (e.g., an electric double layer capacitor), or a voltage converter connected to a commercial power supply.

The secondary battery 240 can be any secondary battery such as a lithium-ion battery, a nickel-hydrogen battery, or a lead-based battery. A high-capacity capacitor (e.g., an electric double layer capacitor) may be used instead of the secondary battery 240.

Figure 16A:
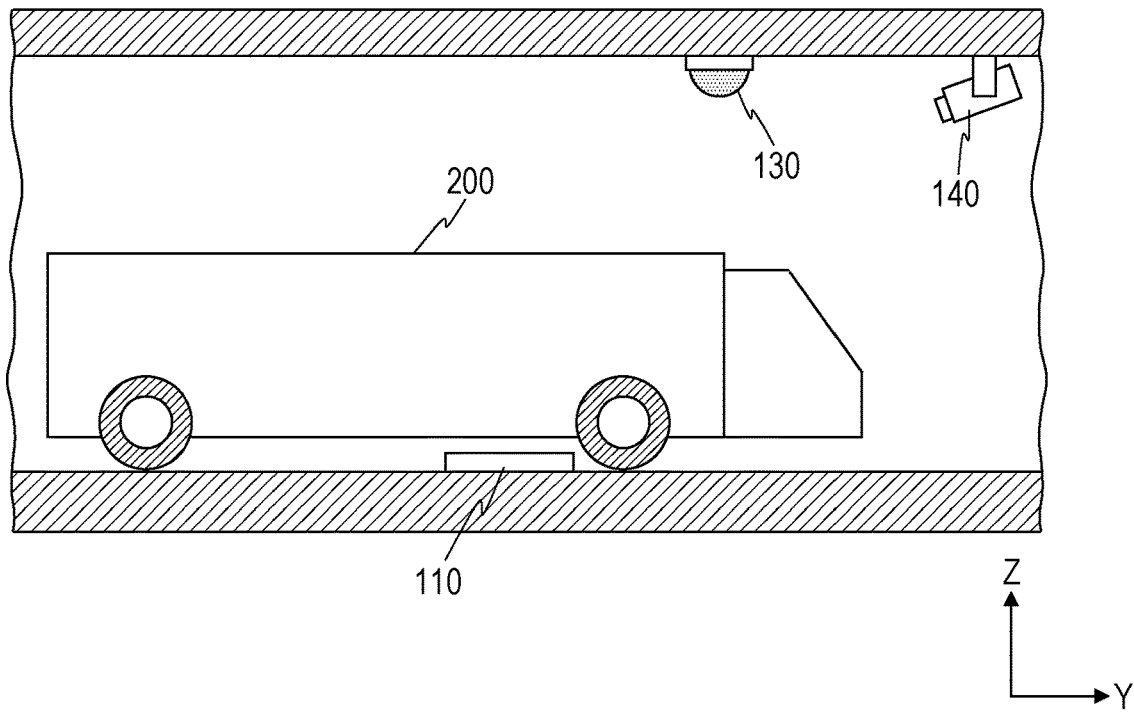
FIG. 16A is a schematic diagram illustrating the wireless power transmission system in an example viewed from a side of the mobile object.
Figure 16B:
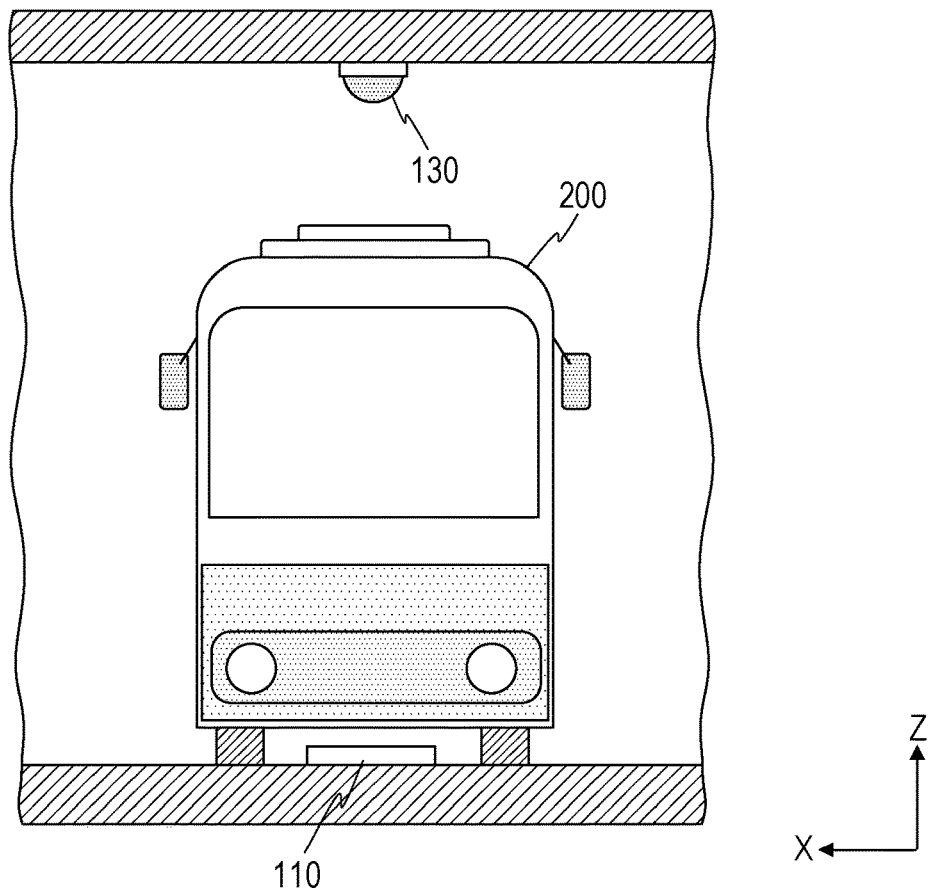
FIG. 16B is a schematic diagram illustrating the wireless power transmission system in the example viewed from a front of the mobile object.

Next, an example of the arrangement of the thermal sensor 130 and the position sensor 140 will be described with reference to FIGS. 16A and 16B. FIG. 16A is a schematic diagram illustrating the wireless power transmission system in an example viewed from a side of the mobile object 200. FIG. 16B is a schematic diagram illustrating the wireless power transmission system in the example viewed from a front of the mobile object 200. As illustrated in FIG. 16A, the thermal sensor 130 and the position sensor 140 in this example are arranged ahead of the power transmitting coil 110 in a traveling direction of the mobile object 200. By arranging the thermal sensor 130 and the position sensor 140 in this manner, the metal foreign object 400 and the mobile object 200 can be detected until immediately before the mobile object 200 overlaps the power transmitting coil 110. In addition, as illustrated in FIG. 16B, the thermal sensor 130 and the position sensor 140 (not illustrated) are arranged such that X-coordinates of the thermal sensor 130 and the position sensor 140 substantially match the center of the mobile object 200 or the center of the power transmitting coil 110. Such an arrangement is desirable to measure the positions of the metal foreign object 400 and the mobile object 200 more accurately.

Figure 17:
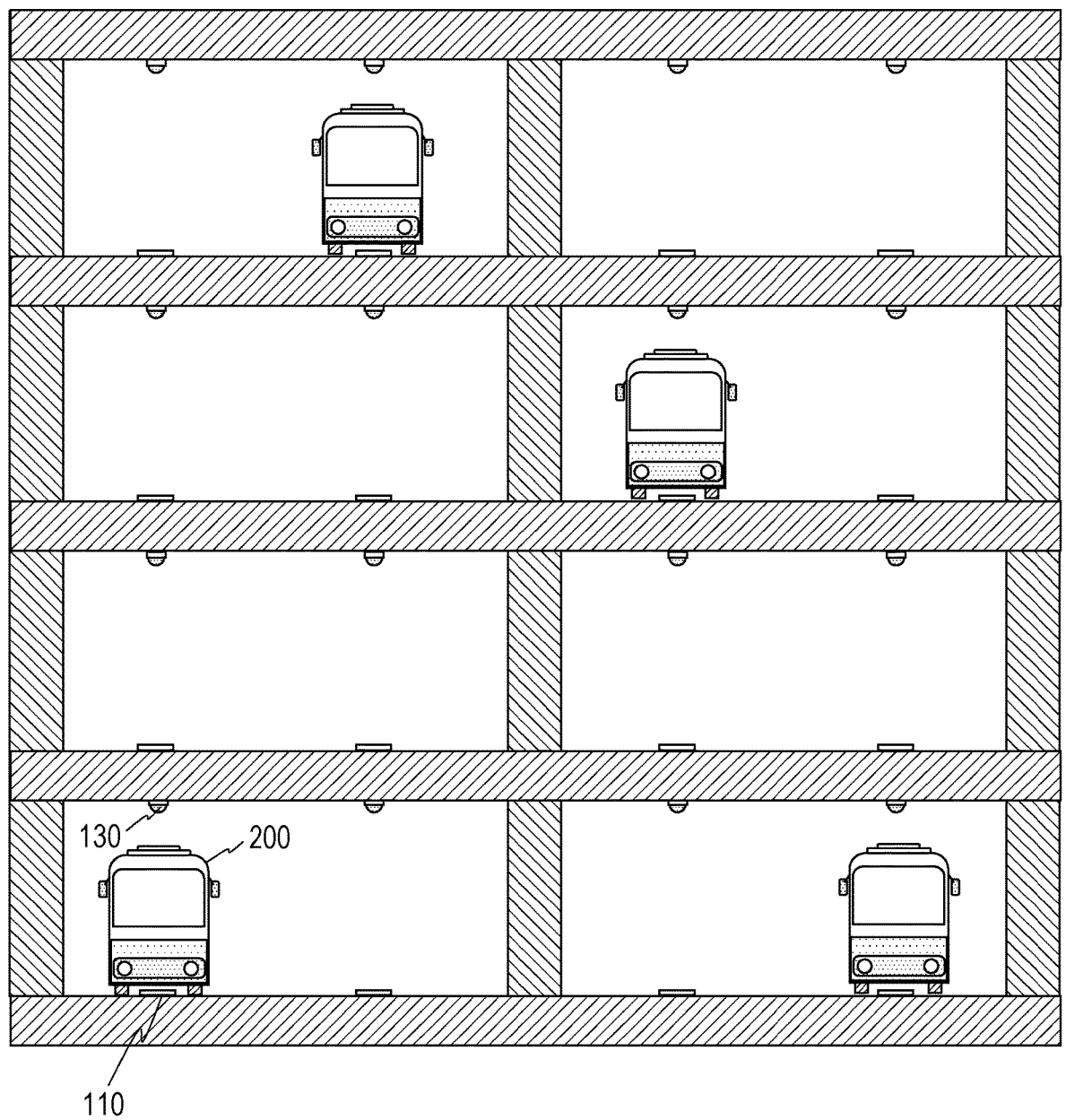
FIG. 17 is a diagram illustrating an example of the application of the wireless power transmission system according to the first embodiment.

FIG. 17 is a diagram illustrating an example of the application of the wireless power transmission system according to the present embodiment. In this example, the wireless power transmission system is used in a multistory parking garage. Thermal sensors 130 are provided on a ceiling of each floor of the multistory parking garage. Although not illustrated in FIG. 17, position sensors 140 are also provided on the ceiling of each floor. Power transmitting coils 110 are provided on a floor surface of each floor. Since the thermal sensors 130 and the position sensors 140 are arranged above corresponding mobile objects 200, metal foreign objects 400 and mobile object 200 can be easily detected. The wireless power transmission system according to the present embodiment is suitable for a roofed parking lot such as that illustrated in FIG. 17.

In FIG. 17, if the mobile object 200 is backed into a parking space, the thermal sensor 130 may be arranged behind the mobile object 200.

Second Embodiment

Figure 18A:
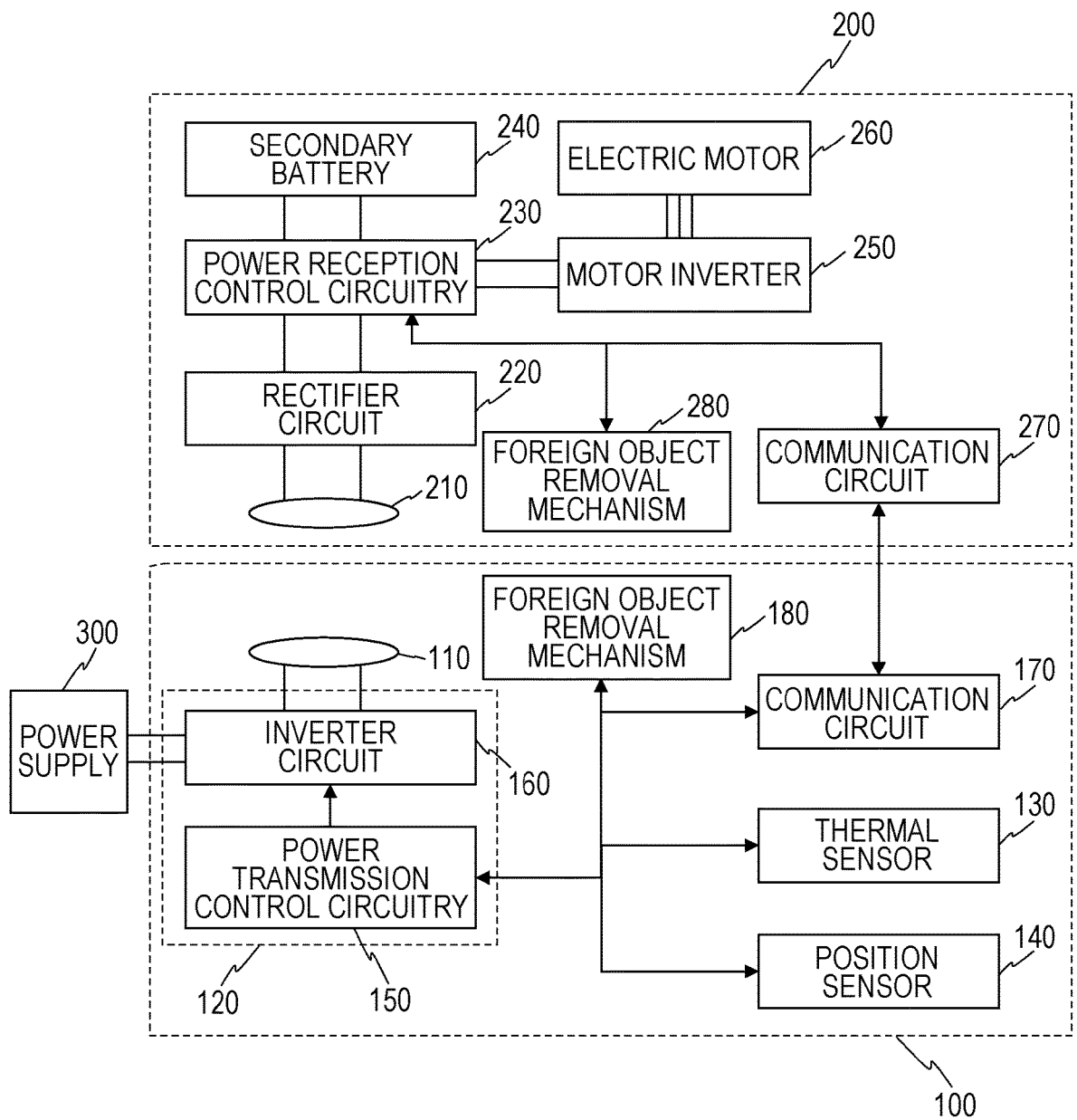
FIG. 18A is a diagram illustrating an example of the configuration of a wireless power transmission system according to a second exemplary embodiment of the present disclosure.

Next, a wireless power transmission system according to a second exemplary embodiment of the present disclosure will be described. The wireless power transmission system according to the present embodiment is different from that according to the first embodiment in that if a metal foreign object is detected, a device other than a power transmitting device is notified of the presence of the metal foreign object. As a result of this operation, a person concerned can be notified of the present of the metal foreign object, and the metal foreign object can be promptly removed. The present embodiment has a large number of variations with respect to an operation performed after the other device is notified of the presence of the metal foreign object. Major variations will be described hereinafter. In each of the following examples of the present embodiment, outputting of power may be stopped or output power may be reduced as in the first embodiment if a metal foreign object is detected. The configuration of the power transmitting device 100 and the mobile object 200 according to the present embodiment is basically the same as that according to the first embodiment. In the present embodiment, however, at least either the power transmitting device 100 or the mobile object 200 may include the above-described foreign object removal mechanism. FIG. 18A is a diagram illustrating an example of such a configuration. In this example, the power transmitting device 100 and the mobile object 200 include foreign object removal mechanisms 180 and 280, respectively. As described above, the foreign object removal mechanisms 180 and 280 can employ various configurations, and any configuration with which a foreign object can be removed may be employed.

FIG. 18B is a flowchart illustrating a basic operation performed by the power transmission control circuitry 150 according to the present embodiment. Steps S301 to S303 are the same as steps S151 to S153, respectively, illustrated in FIG. 9. If a metal foreign object 400 is detected in this example, the power transmission control circuitry 150, in step S304, transmits a signal indicating the presence or a position of the metal foreign object 400 to a device other than the power transmitting device 100. The thermal sensor 130 can identify the position of the metal foreign object 400 on the power transmitting coil 110 on the basis of measured temperature distribution. The other device can be, for example, a smartphone carried by a driver of the mobile object 200 or an automotive navigation system installed in the mobile object 200. The other device may be a server computer in a caretaker's room or a central monitoring room for managing the power transmitting device 100. The device that has received a signal indicating the presence of the metal foreign object 400 displays an image indicating the presence of the metal foreign object 400, for example, on a display. As a result, the driver of the mobile object 200 or the caretaker of the power transmitting device 100 (also referred to as a "person concerned") can notice the presence of the metal foreign object 400 and remove the metal foreign object 400 himself/herself or have a worker remove the metal foreign object 400. Power transmission can then safely start.

Figure 19:
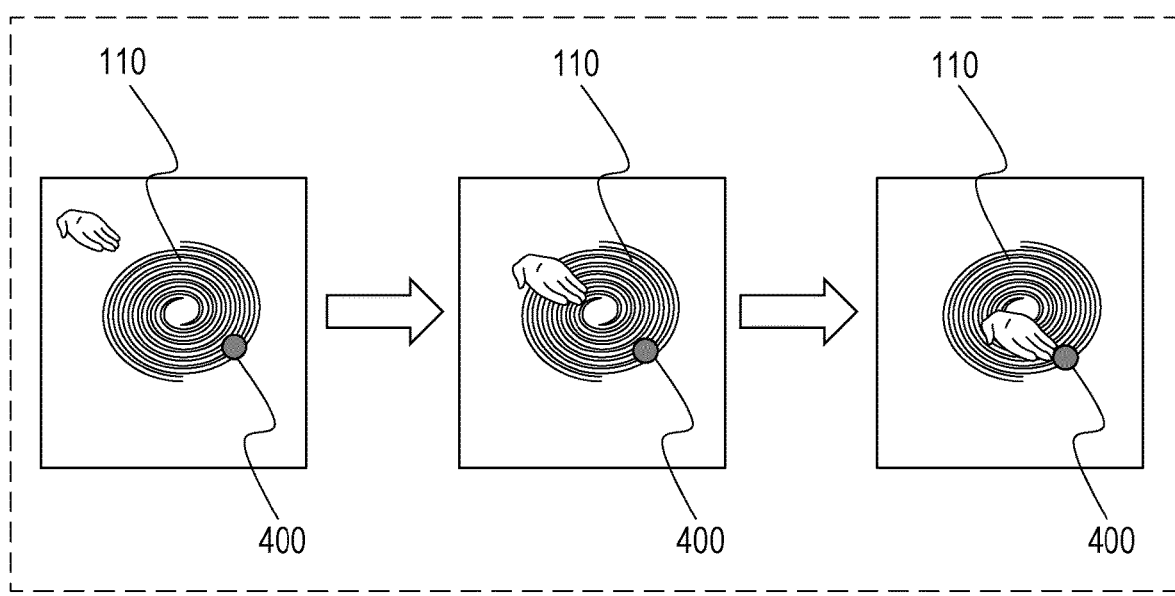
FIG. 19 is a diagram illustrating images of a procedure for checking a position of a metal foreign object on a power transmitting coil on a display and removing the metal foreign object.

FIG. 19 is a diagram illustrating images of a procedure for checking the position of the metal foreign object 400 on the power transmitting coil 110 on the display and removing the metal foreign object 400. As illustrated in FIG. 19, the display of the other device can display images with which a positional relationship between the power transmitting device 100 and the metal foreign object 400 can be identified. A person concerned can remove the metal foreign object 400 on the basis of these images. FIG. 19 also illustrates a hand of a person who is trying to remove the metal foreign object 400. Such a hand may or may not be displayed.

Because the surface temperature of the metal foreign object 400 can be high, the metal foreign object 400 may be removed using a tool in order to avoid a burn.

Next, an example will be described in which at least either the power transmitting device 100 or the mobile object 200 performs an operation for removing a foreign object. As described above, at least either the power transmitting device 100 or the mobile object 200 can include a foreign object removal mechanism. If the surface temperature of the metal foreign object 400 measured by the thermal sensor 130 is equal to or higher than a threshold, the power transmission control circuitry 150 of the power transmitting device 100 causes the foreign object removal mechanism of at least either the power transmitting device 100 or the mobile object 200 to perform the operation for removing a foreign object. A specific example will be described hereinafter.

Figure 20:
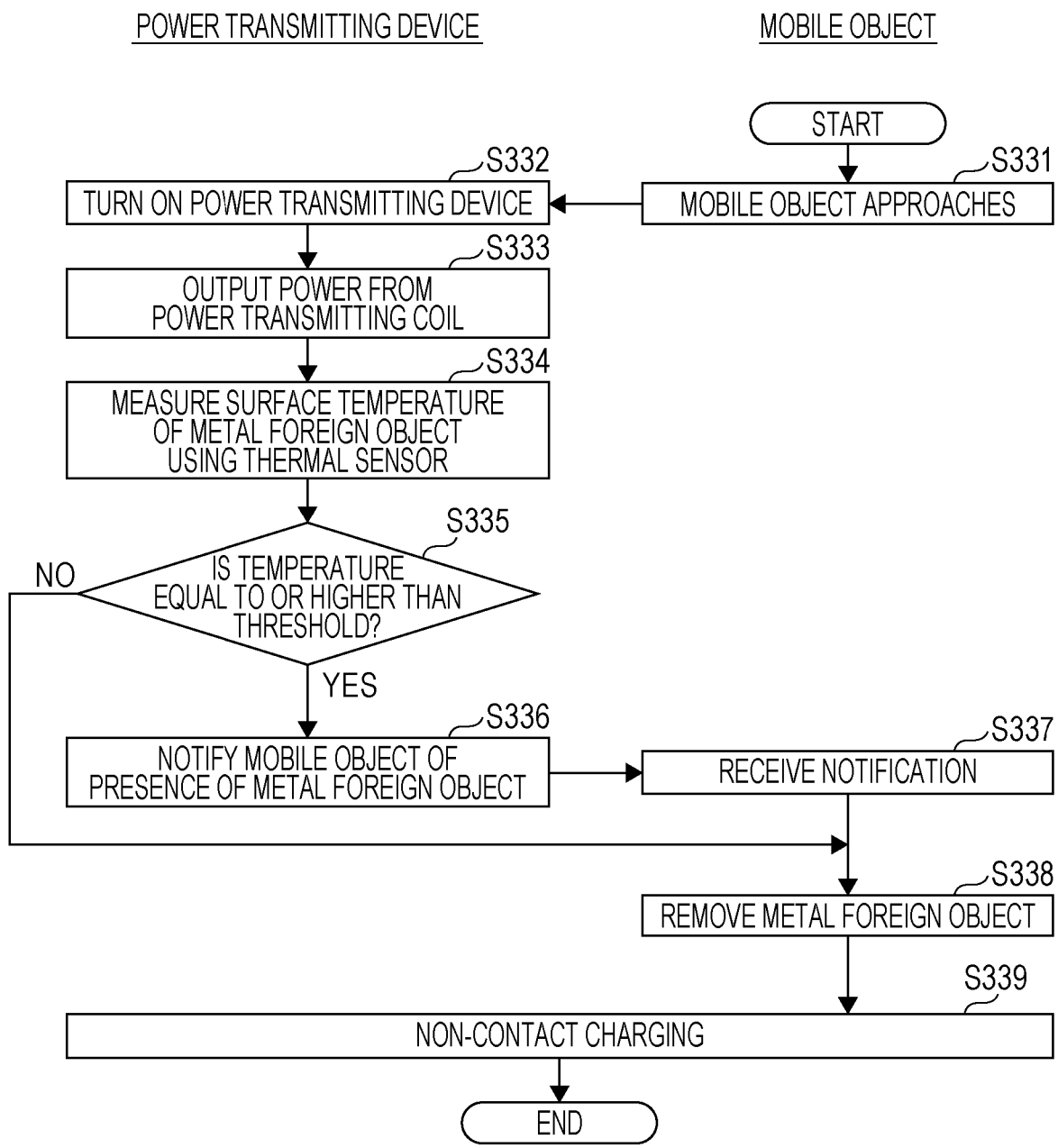
FIG. 20 is a flowchart illustrating another example of the operation according to the second embodiment.

FIG. 20 is a flowchart illustrating another example of the operation according to the present embodiment. In this example, the mobile object 200 includes the foreign object removal mechanism and performs the operation for removing the metal foreign object 400. When the mobile object 200 approaches the power transmitting coil 110 (step S331), the power transmitting device 100 turns on (step S332). The power transmission control circuitry 150 causes the power transmitting coil 110 to output power (step S333). Next, the power transmission control circuitry 150 measures the surface temperature of the metal foreign object 400 using the thermal sensor 130 (step S334) and determines whether the temperature is equal to or higher than the threshold (step S335). If so, the power transmission control circuitry 150 transmits a signal indicating the presence of the metal foreign object 400 to the mobile object 200 through the communication circuit 170 (step S336). Upon receiving the signal (step S337), the mobile object 200 moves closer to the power transmitting coil 110 and performs the operation for removing a foreign object (step S338). As described above, the operation for removing a foreign object can be an operation in which, for example, the metal foreign object 400 is swept away by a wiper or a brash provided on the bottom surface of the mobile object 200, the metal foreign object 400 is blown away by a strong wind, or the metal foreign object 400 is sucked in. After the operation for removing a foreign object is completed, the non-contact charging described in the first embodiment is performed (step S339).

Figure 21:
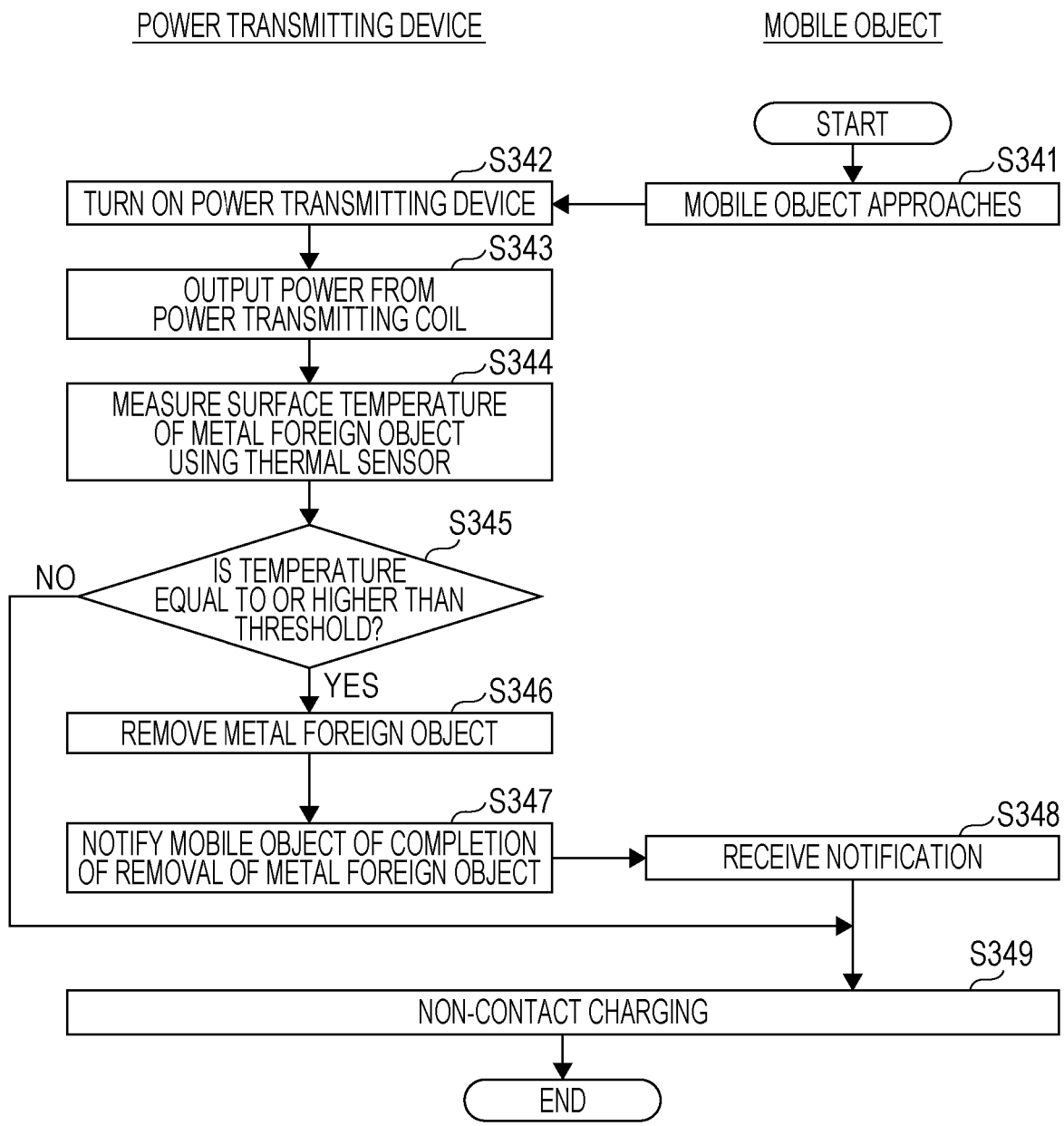
FIG. 21 is a flowchart illustrating yet another example of the operation according to the second embodiment.

FIG. 21 is a flowchart illustrating another example of the operation according to the present embodiment. In this example, the power transmitting device 100 includes the foreign object removal mechanism and performs the operation for removing the metal foreign object 400. Steps S341 to S345 are the same as steps S331 to S335, respectively, illustrated in FIG. 20. If the metal foreign object 400 is detected, the power transmission control circuitry 150, in step S346, causes the foreign object removal mechanism to perform the operation for removing a foreign object (step S346). As described above, the operation for removing a foreign object can be an operation in which, for example, the metal foreign object 400 is swept away by a wiper or a brash provided on the bottom surface of the mobile object 200, the metal foreign object 400 is blown away by a strong wind, or the cover member 112 of the power transmitting coil 110 is tilted. After the metal foreign object 400 is removed, the power transmission control circuitry 150 transmits a signal indicating that the metal foreign object 400 has been removed (step S347). Upon receiving the signal (step S348), the non-contact charging starts (step S349).

Figure 22:
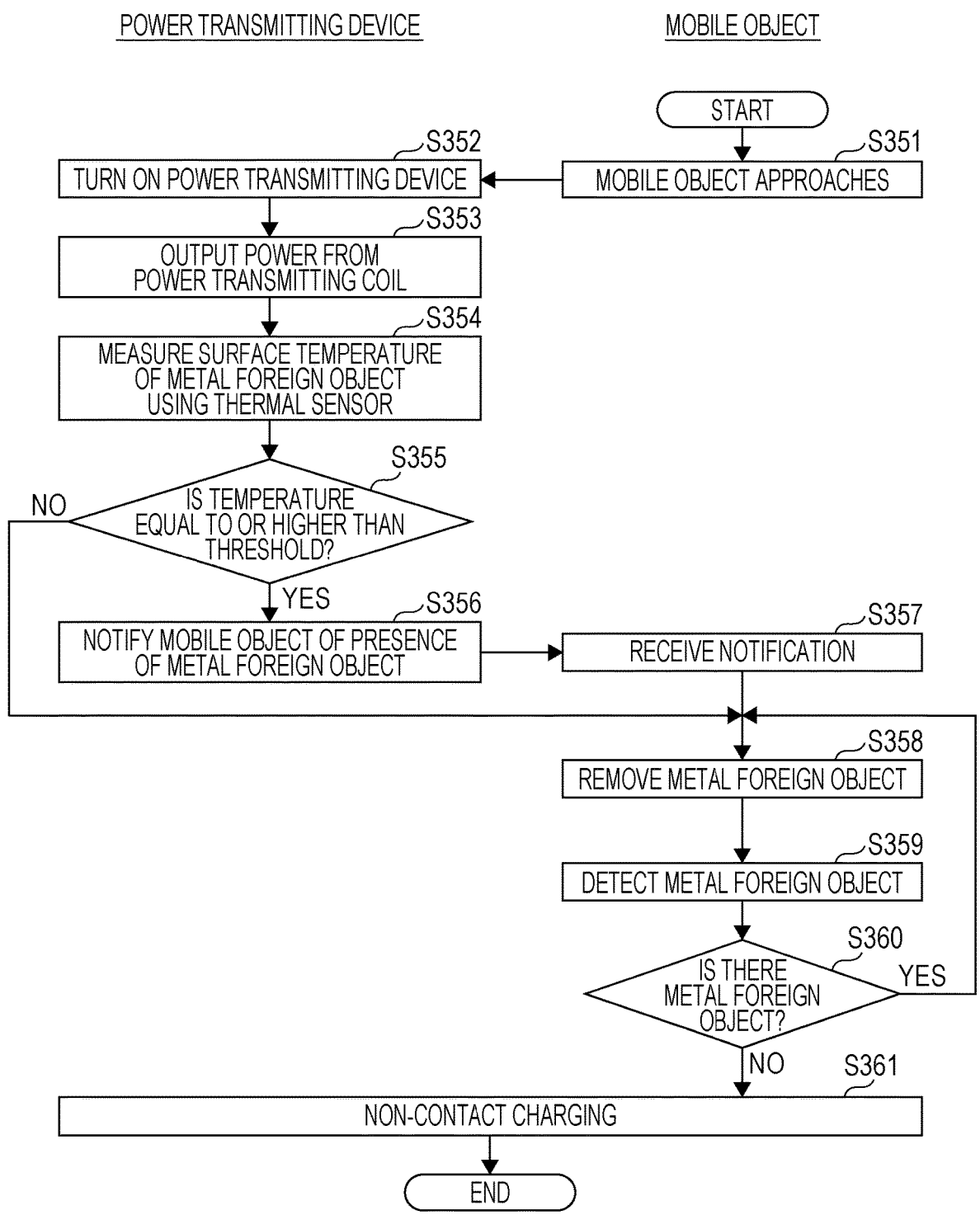
FIG. 22 is a flowchart illustrating yet another example of the operation according to the second embodiment.

FIG. 22 is a diagram illustrating yet another example of the operation according to the present embodiment. Steps S351 to S358 in this example are the same as steps S331 to S338, respectively, in the example illustrated in FIG. 20. A difference is that, in this example, the mobile object 200, in step S359, detects presence or absence of a metal foreign object 400 after performing the operation for removing a foreign object. A metal foreign object 400 might not be completely removed with a single operation for removing a foreign object. In this example, therefore, presence or absence of a metal foreign object 400 is checked after the operation for removing a foreign object, and if the metal foreign object 400 has not been removed, the mobile object 200 performs the operation for removing a foreign object again (step S360). The mobile object 200 detects the metal foreign object 400 by, for example, measuring the efficiency of power transmission. A trial power transmission operation is performed after the operation for removing a foreign object, and if transmission efficiency is significantly lower than an efficiency in a normal operation, it is determined that there is the metal foreign object 400. If it is confirmed in step S360 that the metal foreign object 400 has been received, the non-contact charging is performed (step S361). If it is determined in step S360 there is the metal foreign object 400 even after steps S358 to S360 are repeated a plurality of times, the power reception control circuitry 230 or the power transmission control circuitry 150 may transmit a signal indicating that it is difficult to remove the metal foreign object 400 to another device registered in advance, such as a smartphone. As a result, a person concerned can be notified of the presence of the metal foreign object 400.

Figure 23:
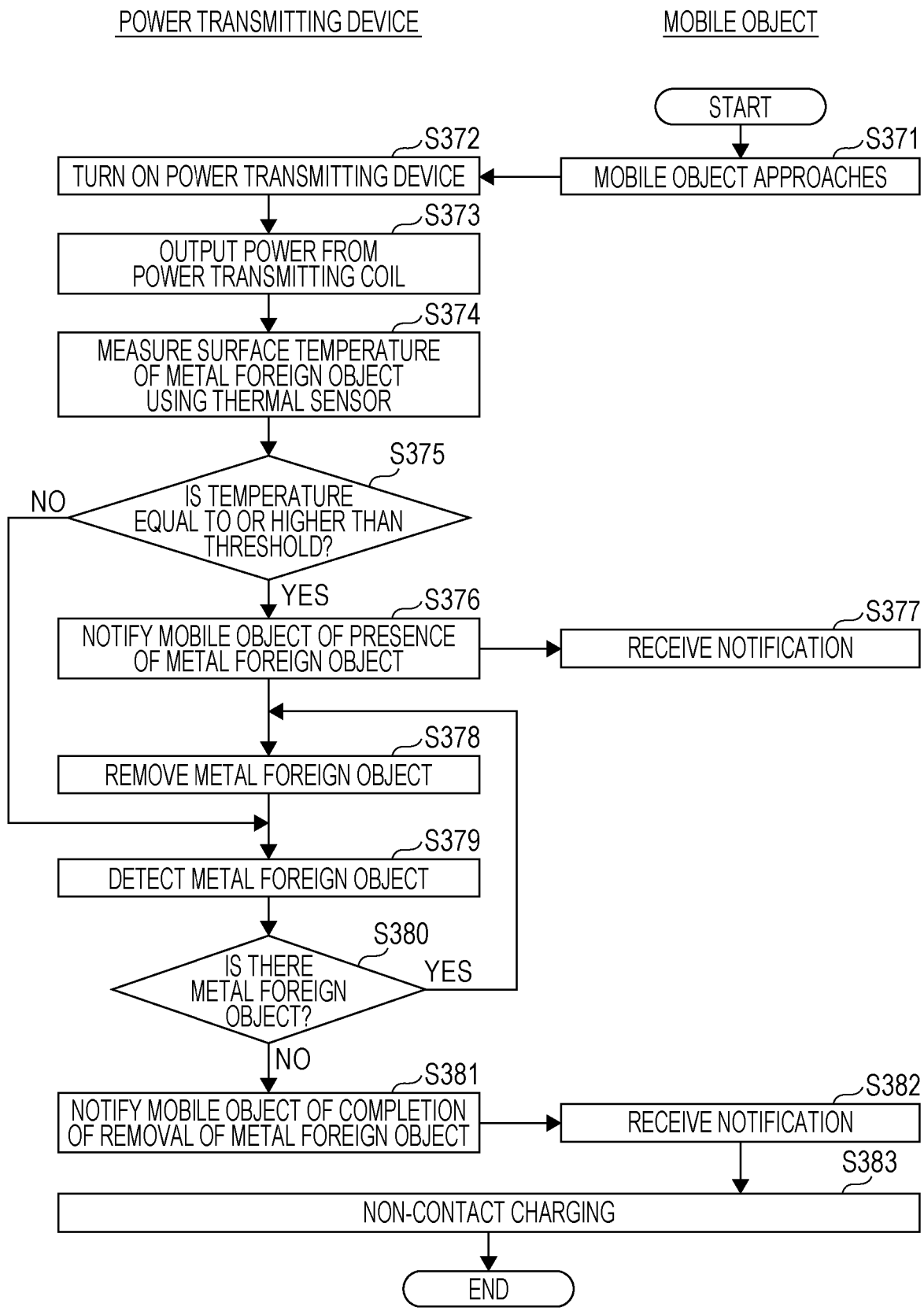
FIG. 23 is a flowchart illustrating yet another example of the operation according to the second embodiment.

FIG. 23 is a diagram illustrating yet another example of the operation according to the present embodiment. Steps S371 to S377 in this example are the same as steps S351 to S357, respectively, in the example illustrated in FIG. 22. In this example, the power transmitting device 100 performs the operation for removing a foreign object and then performs an operation for detecting the metal foreign object 400. The power transmitting device 100 repeats the operation for removing a foreign object until the metal foreign object 400 is completed removed (steps S378 to S380). The determination in steps S379 and S380 as to whether the metal foreign object 400 has been completely removed can be made, as described above, on the basis of a decrease in the efficiency of power transmission. After the removal of the metal foreign object 400 is confirmed, the power transmitting device 100 transmits a signal indicating the completion of the removal of the metal foreign object 400 to the mobile object 200 (step S381). After the mobile object 200 receives the signal (step S382), the non-contact charging is performed (step S383). If it is determined in step S380 that there is the metal foreign object 400 even after steps S378 to S380 are performed a plurality of times, the power transmission control circuitry 150 may transmit a signal indicating that it is difficult to remove the metal foreign object 400 to another device registered in advance, such as a smartphone. As a result, a person concerned can be notified of the presence of the metal foreign object 400. The power transmission control circuitry 150 may thus detect whether the metal foreign object 400 has been actually removed after the power transmitting device 100 performs the operation for removing a foreign object, and transmit a signal indicating a result of the detection to another device.

Although either the power transmitting device 100 or the mobile object 200 performs the operation for detecting a foreign object in the examples illustrated in FIGS. 20 to 23, both the power transmitting device 100 and the mobile object 200 may perform the operation for detecting a foreign object. An example of such an operation will be described hereinafter.

Figure 24:
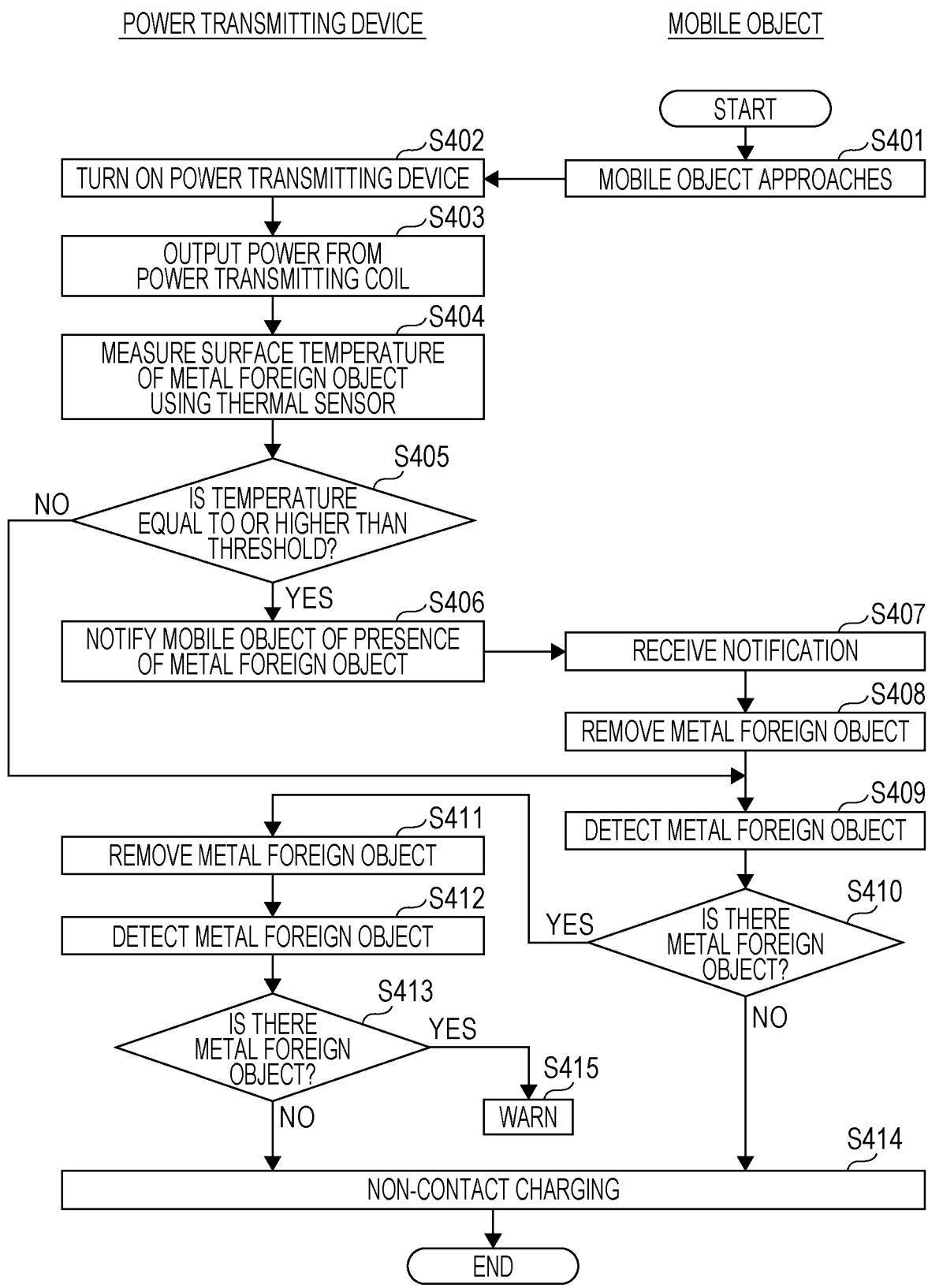
FIG. 24 is a flowchart illustrating yet another example of the operation according to the second embodiment.

FIG. 24 is a diagram illustrating yet another example of the operation according to the present embodiment. Steps S401 to S410 are the same as steps S351 to S360, respectively, in the example illustrated in FIG. 22. In this example, first, the mobile object 200 performs the operation for removing a foreign object (step S408). The power reception control circuitry 230 of the mobile object 200 then checks whether the metal foreign object 400 has been actually removed (steps S409 and S410). If the metal foreign object 400 has not been removed, the mobile object 200 transmits a signal indicating that the metal foreign object 400 has not been removed, and the power transmitting device 100 performs the operation for removing a foreign object (step S411). The power transmitting device 100 then checks whether the metal foreign object 400 has been actually removed (steps S412 and S413). If the metal foreign object 400 has been removed, the non-contact charging starts (step S414). If the metal foreign object 400 has not been removed, the power transmission control circuitry 150 transmits, to another device, a signal (warning) indicating that the metal foreign object 400 has not been removed (step S415). The metal foreign object 400 is then manually removed.

Figure 25:
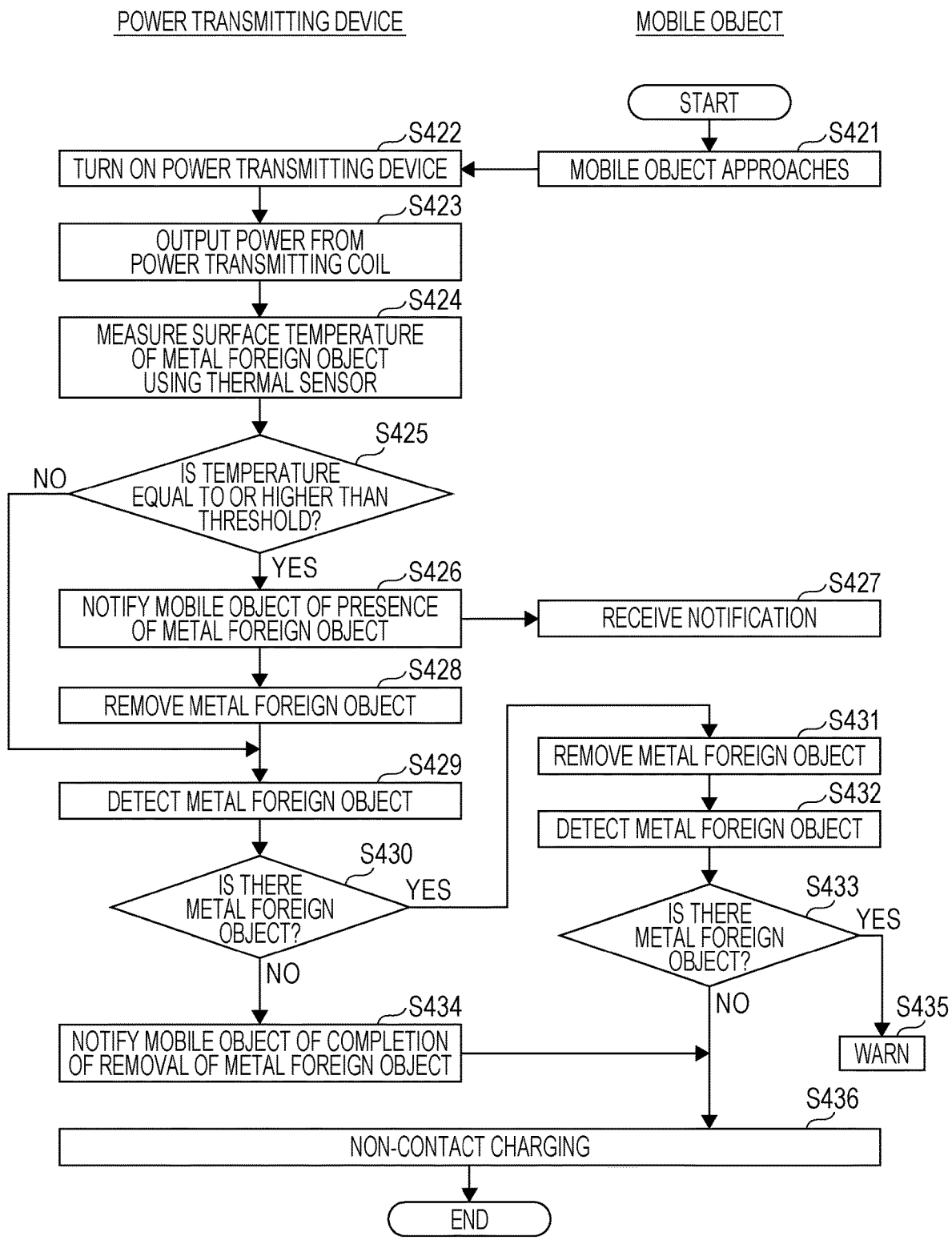
FIG. 25 is a flowchart illustrating yet another example of the operation according to the second embodiment.

FIG. 25 is a diagram illustrating yet another example of the operation according to the present embodiment. In this example, first, the power transmitting device 100 performs the operation for removing a foreign object (step S428). If the metal foreign object 400 has not been removed, the mobile object 200 performs the operation for removing a foreign object (step S431). If the metal foreign object 400 has not been removed as a result of the operation for removing a foreign object performed by the mobile object 200 (YES in step S433), the power transmitting device 100 transmits a warning to another device (step S435). The other steps are the same as in the operation illustrated in FIG. 24.

As indicated in the examples illustrated in FIGS. 24 and 25, the power transmitting device 100 and the mobile object 200 can each include a foreign object removal mechanism. If a measured surface temperature of the metal foreign object 400 is equal to or higher than the threshold, the power transmission control circuitry 150 of the power transmitting device 100 causes the foreign object removal mechanism of either the power transmitting device 100 or the mobile object 200 to perform the operation for removing a foreign object. After the operation for removing a foreign object is performed, the power transmission control circuitry 150 detects whether the metal foreign object 400 has been actually removed. If the metal foreign object 400 has not been removed, the power transmission control circuitry 150 of the power transmitting device 100 causes the foreign object removal mechanism of the other of the power transmitting device 100 and the mobile object 200 to perform another operation for removing a foreign object. As a result of this operation, the metal foreign object 400 can be removed more certainly.

Figure 26:
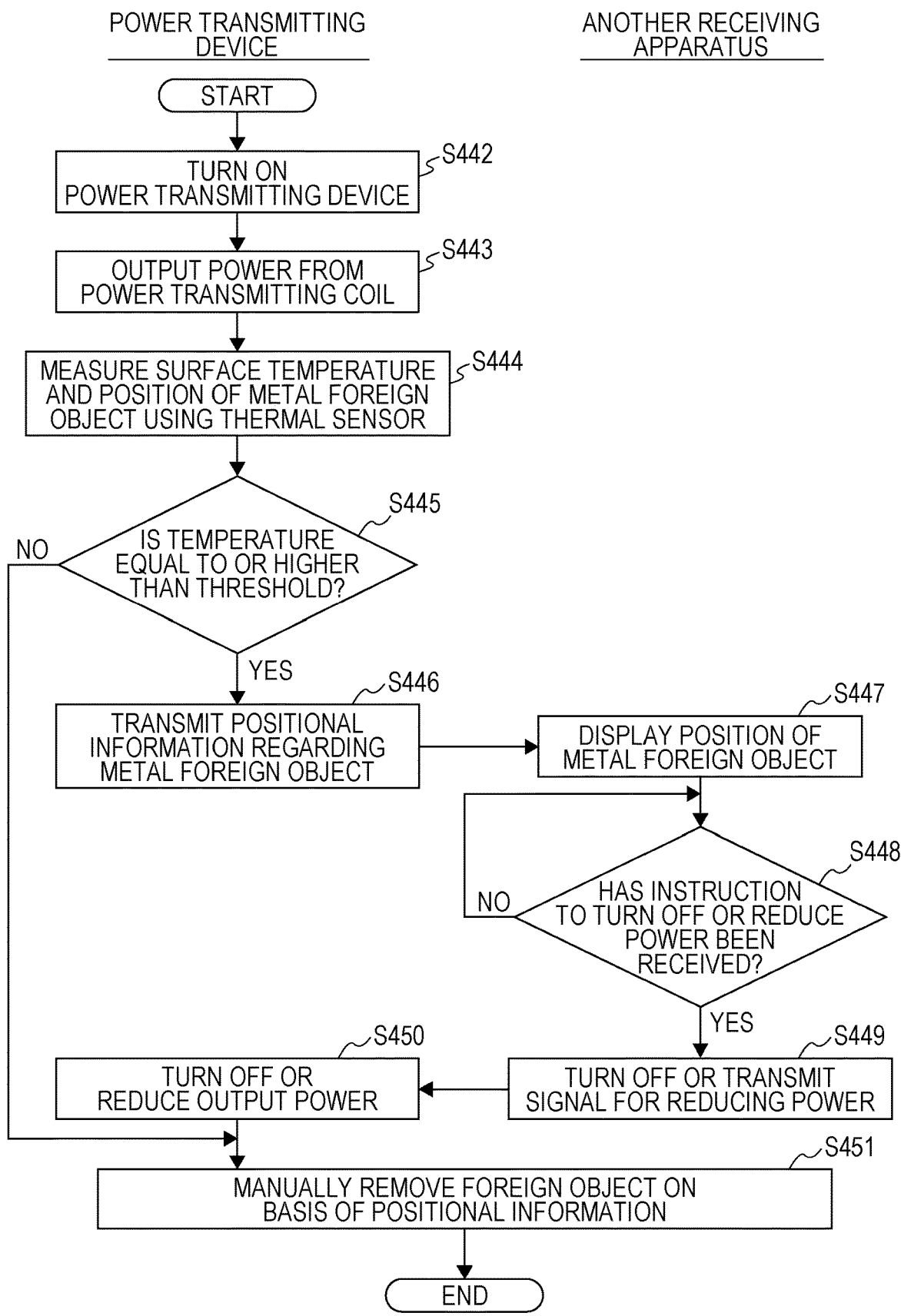
FIG. 26 is a flowchart illustrating yet another example of the operation according to the second embodiment.

FIG. 26 is a diagram illustrating yet another example of the operation according to the present embodiment. In this example, if the surface temperature of the metal foreign object 400 is equal to or higher than the threshold, the power transmission control circuitry 150 transmits, to another device (e.g., a smartphone, an automotive navigation system, or the server computer in the monitoring room), information regarding the position of the metal foreign object 400 on the power transmitting coil 110 (step S446). Upon receiving the information, the other device displays an image indicating the position of the metal foreign object 400 on the power transmitting coil 110 on a display (step S447). As a result, a user or the caretaker can understand the presence of the metal foreign object 400 and the position of the metal foreign object 400 on the power transmitting coil 110. In this example, the user can issue an instruction to turn off the power transmitting device 100 or reduce output power through the other device such as a smartphone or an automotive navigation system. Upon receiving the instruction in step S448, the other device transmits, to the power transmitting device 100, a signal indicating that the power transmitting device 100 is to turn off or that output power is to be reduced (step S449). Upon receiving the signal, the power transmission control circuitry 150 of the power transmitting device 100 turns off (stop outputting power) or reduces output power (step S450). As a result, the metal foreign object 400 is no longer heated. The metal foreign object 400 is then removed manually (step S451).

Figure 27:
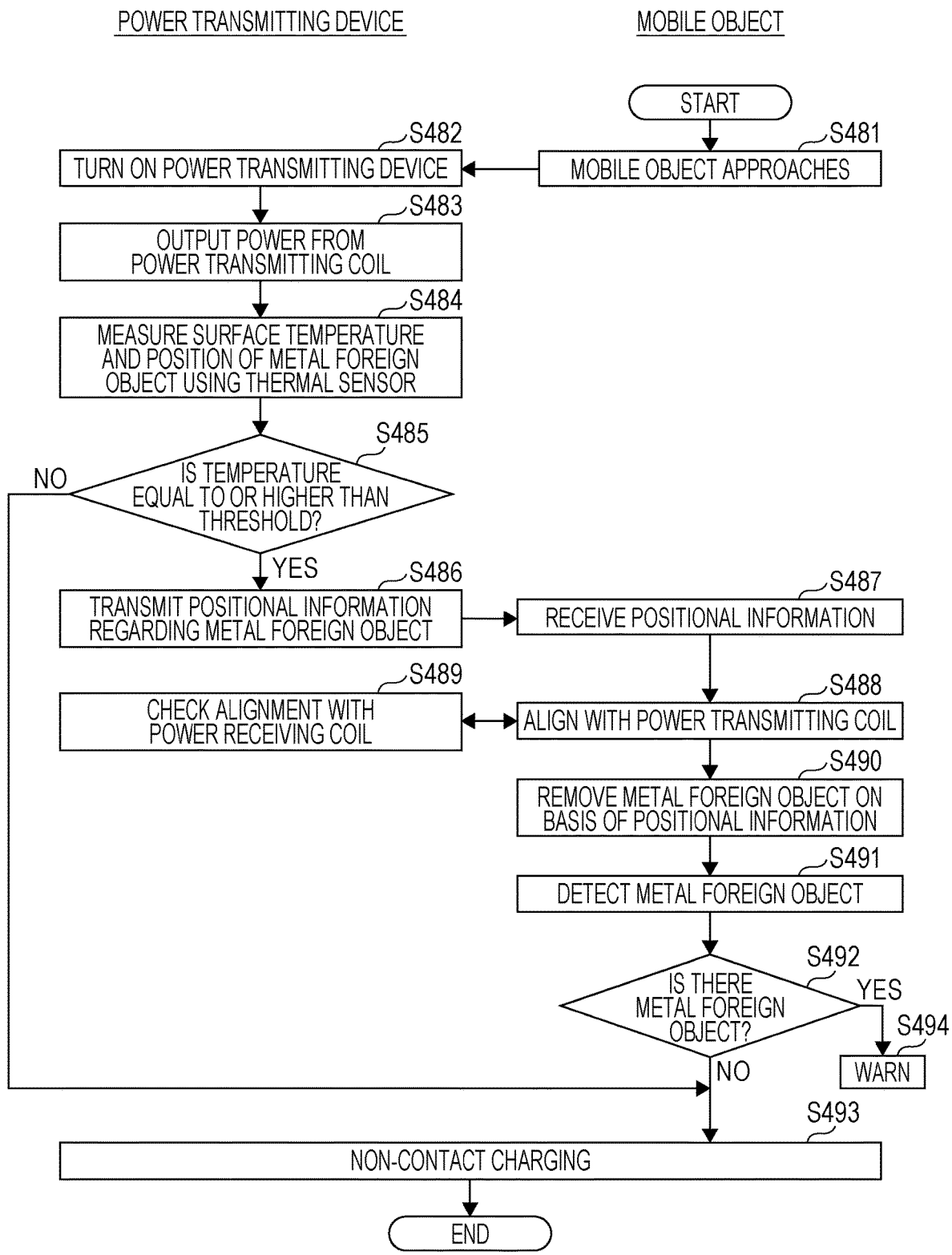
FIG. 27 is a flowchart illustrating yet another example of the operation according to the second embodiment.

FIG. 27 is a diagram illustrating yet another example of the operation according to the present embodiment. In the operation in this example, as in the operation illustrated in FIG. 22, the mobile object 200 performs the operation for removing a foreign object. A difference from the example illustrated in FIG. 22 is that the power transmitting device 100 transmits information regarding the position of the metal foreign object 400 on the power transmitting coil 110 to the mobile object 200 (step S486), and the mobile object 200 aligns the power receiving coil 210 with the power transmitting coil 110 (steps S488 and S489), performs the operation for removing a foreign object on the basis of the information regarding the position of the metal foreign object 400 on the power transmitting coil 110 (step S490), and, if the metal foreign object 400 has not been removed, transmits a warning to another device (step S494). Steps S481 to S486, S491, S492, and S493 are the same as corresponding steps illustrated in FIG. 22. The alignment of the power receiving coil 210 with the power transmitting coil 110 performed in steps S488 and S489 is an operation in which the mobile object 200 moves to face the power receiving coil 210 and the power transmitting coil 110 with each other. As a result, in subsequent step S490, the metal foreign object 400 can be easily removed on the basis of the information regarding the position of the metal foreign object 400 on the power transmitting coil 110. The foreign object removal mechanism of the mobile object 200 can remove the metal foreign object 400 more certainly by carefully sweeping or sucking in in an area in which the metal foreign object 400 is expected to be located.

Figure 28:
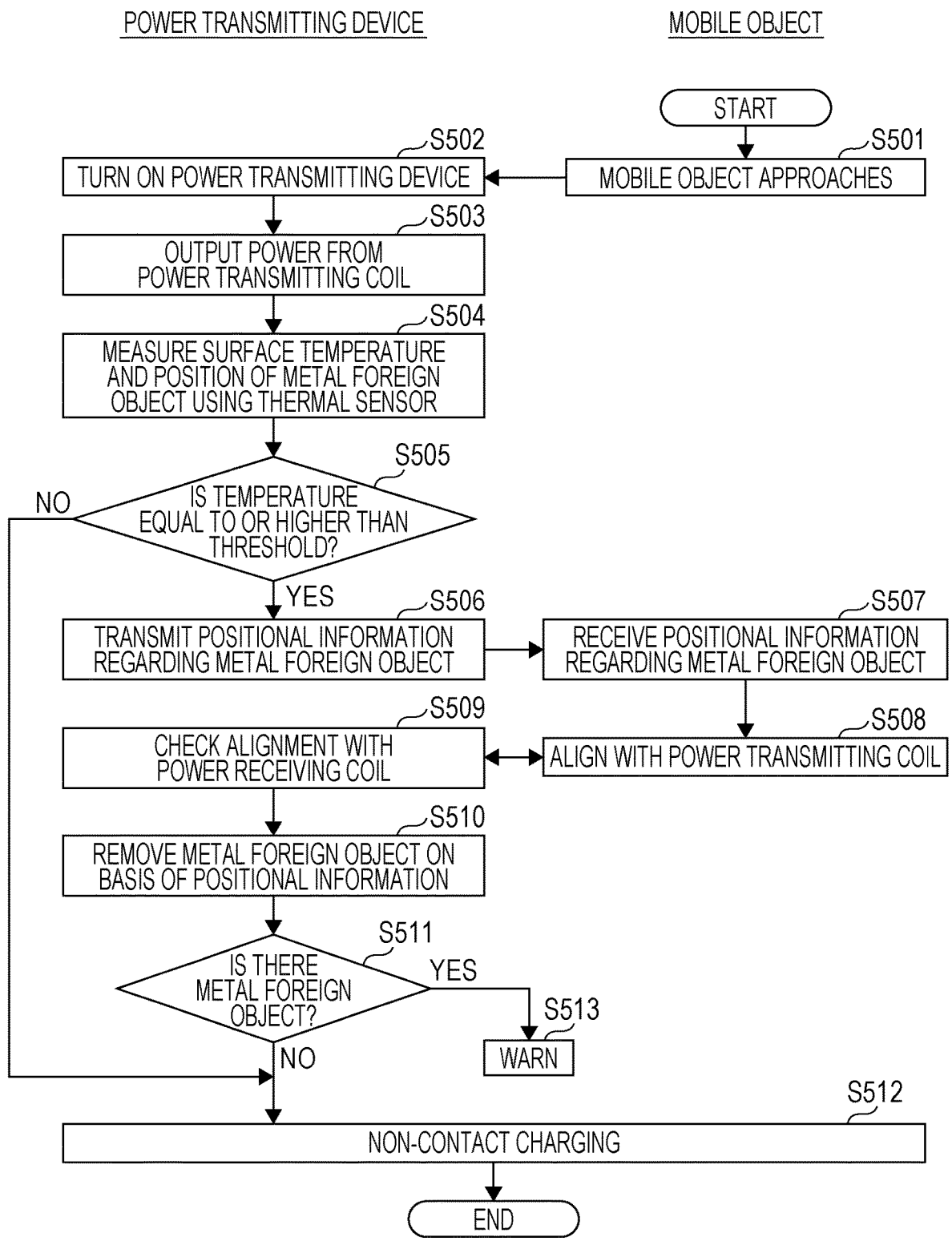
FIG. 28 is a flowchart illustrating yet another example of the operation according to the second embodiment.

FIG. 28 is a diagram illustrating yet another example of the operation according to the present embodiment. In this example, the power transmitting device 100, not the mobile object 200, removes the metal foreign object 400 on the basis of positional information (step S510). The other steps are the same as in the operation illustrated in FIG. 27. In this example, the foreign object mechanism of the power transmitting device 100 carefully performs, on the basis of the information regarding the position of the metal foreign object 400 on the power transmitting coil 110, the operation for removing a foreign object in an area in which the metal foreign object 400 is expected to be located. As a result, the metal foreign object 400 can be removed more certainly.

Figure 29:
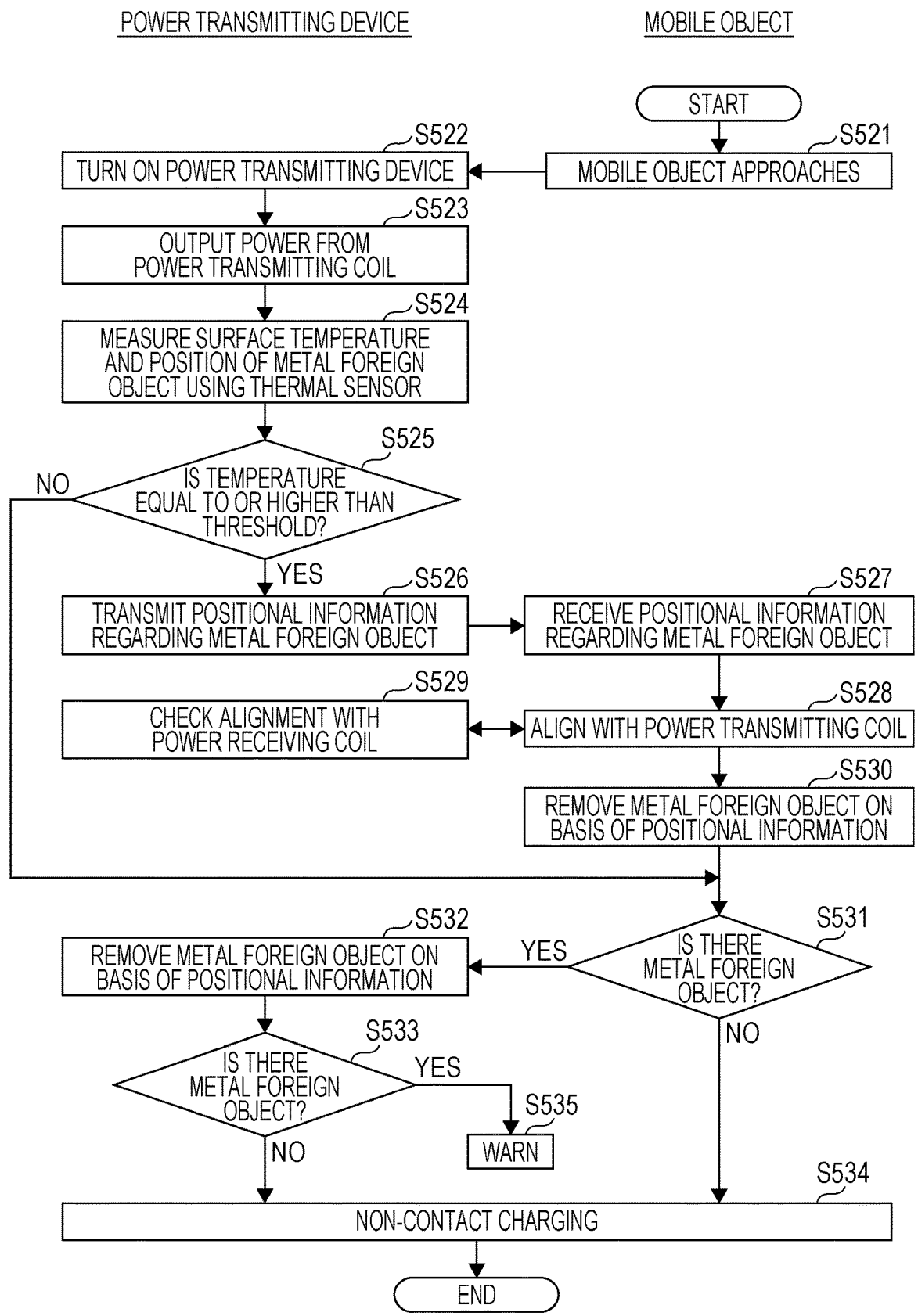
FIG. 29 is a flowchart illustrating yet another example of the operation according to the second embodiment.

FIG. 29 is a diagram illustrating yet another example of the operation according to the present embodiment. In this example, both the power transmitting device 100 and the mobile object 200 perform the operation for removing a foreign object. First, the mobile object 200 performs the operation for removing a foreign object that is the same as that in the example illustrated in FIG. 27 (step S530). If the metal foreign object 400 has not been removed as a result of the operation (YES in step S531), the power transmitting device 100 performs the operation for removing a foreign object on the basis of the information (step S532). If the metal foreign object 400 has not been removed, the power transmitting device 100 transmits a warning to another device (step S535). The other steps are the same as corresponding steps illustrated in FIG. 27.

Figure 30:
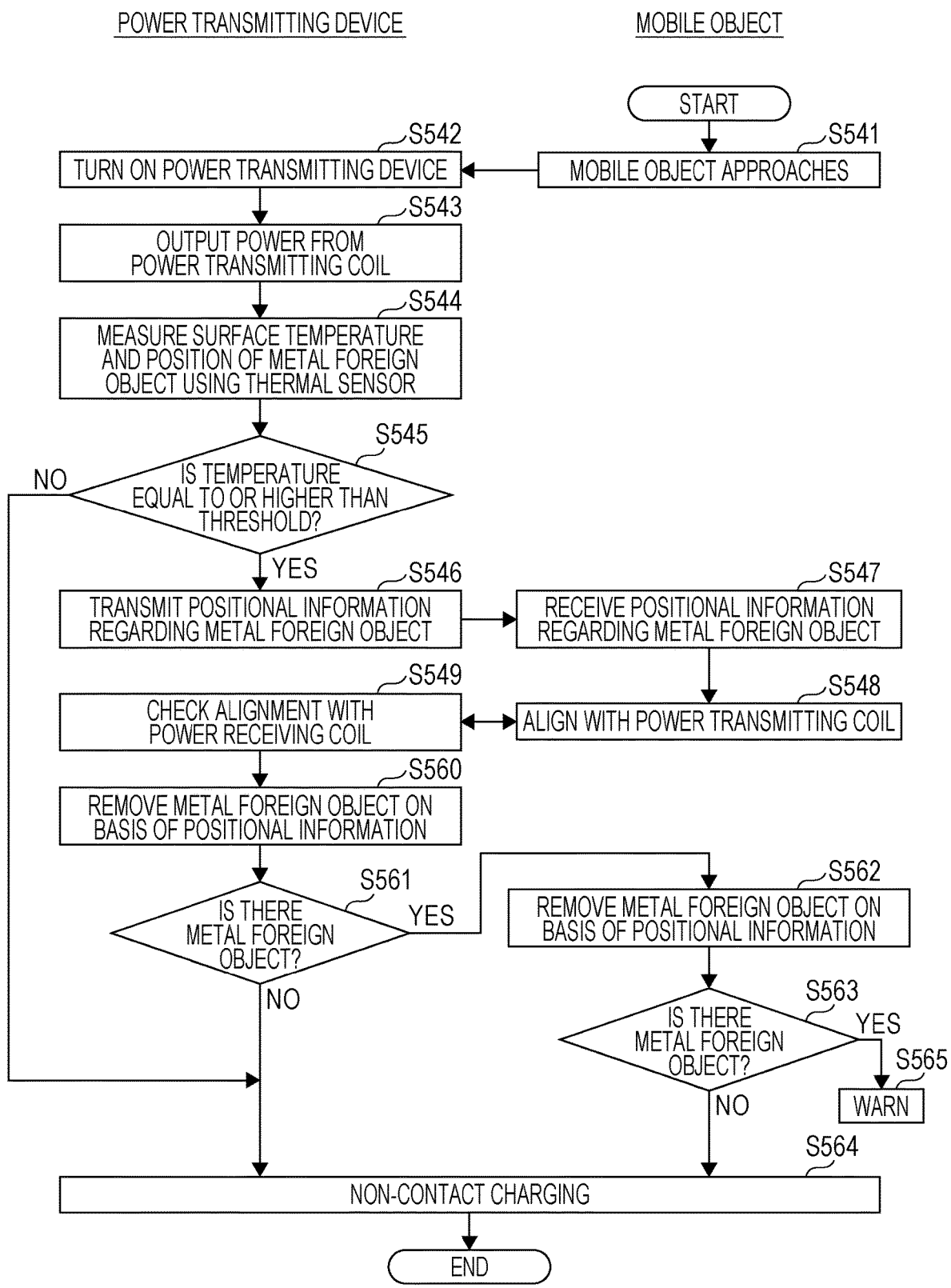
FIG. 30 is a flowchart illustrating yet another example of the operation according to the second embodiment.

FIG. 30 is a diagram illustrating yet another example of the operation according to the present embodiment. In this example, too, both the power transmitting device 100 and the mobile object 200 perform the operation for removing a foreign object. First, the power transmitting device 100 performs the operation for removing a foreign object that is the same as that in the example illustrated in FIG. 28 (step S560). If the metal foreign object 400 has not been removed as a result of this operation (YES in step S561), the mobile object 200 performs the operation for removing a foreign object on the basis of positional information (step S562). If the metal foreign object 400 has not been removed, the mobile object 200 transmits a warning to another device (step S565). The other steps are the same as corresponding steps illustrated in FIG. 28.

As described above, in the present embodiment, after the thermal sensor 130 detects a metal foreign object 400, a signal indicating the presence of the metal foreign object 400 is transmitted to a device other than the power transmitting device 100. As a result, for example, the mobile object 200 can remove the metal foreign object 400, or the metal foreign object 400 can be manually removed. As described above, the power transmitting device 100 and the mobile object 200 can complementarily perform the operation for removing a foreign object. In this case, the metal foreign object 400 can be certainly removed.

As described above, the present disclosure includes a wireless power transmission apparatus described in the following items.

Item 1

A method for detecting a metal foreign object using a power transmission device, the power transmission device including:

an inverter that generates power;

a power transmitting coil for outputting power to a power receiving coil included in a mobile object;

a thermal sensor that measures a surface temperature of the metal foreign object on the power transmitting coil; and a power transmission control circuitry that causes the inverter to controls the power output from the power transmitting coil;

the method comprising causing the power transmission control circuitry to:

cause the power transmitting coil to output the power before the power receiving coil and the power transmitting coil are electromagnetically coupled with each other and the mobile object overlaps the power transmitting coil;

cause the thermal sensor to measure the surface temperature of the metal foreign object; and transmit, if the measured surface temperature of the metal foreign object is equal to or higher than a threshold, a signal indicating presence of the metal foreign object from the power transmitting device to another receiving apparatus, other than the power transmitting device, having a function of receiving the signal.

Item 2

The method according to Item 1, in which the power output from the power transmitting coil includes first power for detecting the metal foreign object and second power to be transmitted from the power transmitting coil to the power receiving coil, in which the first power is smaller than the second power, in which the power transmitting coil is caused to output the first power before the mobile object overlaps the power transmitting coil, in which the thermal sensor is caused to measure the surface temperature of the metal foreign object while the first power is being output, and in which, if the measured surface temperature of the metal foreign object is equal to or higher than the threshold, the power transmitting coil is caused to reduce the output power or stop outputting the power.

Item 3

The method according to Item 1 or 2, further including:

causing, if the metal foreign object is not detected, the power transmitting coil to output second power after the mobile object reaches the position at which the power receiving coil and the power transmitting coil are electromagnetically coupled with each other.

Item 4

The method according to any of Items 1 to 3, in which the power transmitting device further includes a position sensor that measures a distance between the mobile object and the power transmitting coil or a position of the mobile object, and in which it is determined that the mobile object does not overlap the power transmitting coil on the basis of a result of the measurement performed by the position sensor.

Item 5

A power transmitting device including:

a power transmitting coil for outputting power to a power receiving coil;

a thermal sensor that measures a surface temperature of a metal foreign object on the power transmitting coil; and a power transmission control circuitry that controls the power output from the power transmitting coil, in which the power transmission control circuitry performs operations including causing the power transmitting coil to output the power before a mobile object including the power receiving coil reaches a position at which the power receiving coil and the power transmitting coil are electromagnetically coupled with each other and the mobile object including the power receiving coil overlaps the power transmitting coil, causing the thermal sensor to measure the surface temperature of the metal foreign object, and causing, if the measured surface temperature of the metal foreign object is equal to or higher than a threshold, the power transmitting coil to reduce the output power or stop outputting the power.

Item 6

The power transmitting device according to Item 5, in which the power output from the power transmitting coil includes first power for detecting the metal foreign object and second power to be transmitted from the power transmitting coil to the power receiving coil, in which the first power is smaller than the second power, and in which the power transmission control circuitry performs operations including causing the power transmitting coil to output the first power before the mobile object overlaps the power transmitting coil, causing the thermal sensor to measure the surface temperature of the metal foreign object while the first power is being output, and causing, if the measured surface temperature of the metal foreign object is equal to or higher than the threshold, the power transmitting coil to reduce the output power or stop outputting the power.

Item 7

The power transmitting device according to Item 5 or 6, in which, if the metal foreign object is not detected, the power transmission control circuitry causes the power transmitting coil to output the second power after the mobile object reaches the position at which the power receiving coil and the power transmitting coil are electromagnetically coupled with each other.

Item 8

The power transmitting device according to any of Items 5 to 7, further including:

a position sensor that measures a distance between the mobile object and the power transmitting coil or a position of the mobile object, in which the power transmission control circuitry determines that the mobile object does not overlap the power transmitting coil on the basis of a result of the measurement performed by the position sensor.

Item 9

A method for detecting a metal foreign object using a power transmission device, the power transmission device including:

an inverter that generates power;

a power transmitting coil for outputting power to a power receiving coil included in a mobile object;

a thermal sensor that measures a surface temperature of the metal foreign object on the power transmitting coil; and a power transmission control circuitry that causes the inverter to controls the power output from the power transmitting coil;

the method comprising causing the power transmission control circuitry to: cause the power transmitting coil to output the power before the power receiving coil and the power transmitting coil are electromagnetically coupled with each other and the mobile object overlaps the power transmitting coil;

cause the thermal sensor to measure the surface temperature of the metal foreign object; and transmit, if the measured surface temperature of the metal foreign object is equal to or higher than a threshold, a signal indicating presence of the metal foreign object from the power transmitting device to another receiving apparatus, other than the power transmitting device, having a function of receiving the signal.

Item 10

The method according to Item 9, in which the signal indicating the presence of the metal foreign object includes positional information regarding the metal foreign object.

Item 11

The method according to Item 9 or 10, in which the power output from the power transmitting coil includes first power for detecting the metal foreign object and second power to be transmitted from the power transmitting coil to the power receiving coil, in which the first power is smaller than the second power, in which the power transmitting coil is caused to output the first power before the mobile object overlaps the power transmitting coil, and in which the thermal sensor is caused to measure the surface temperature of the metal foreign object while the first power is being output.

Item 12

The method according to any of Items 9 to 11, in which the power transmitting device further includes a position sensor that measures a distance between the mobile object and the power transmitting coil or a position of the mobile object, and in which it is determined that the power receiving coil does not overlap the power transmitting coil on the basis of a result of the measurement performed by the position sensor.

Item 13

The method according to any of Items 9 to 12, in which the other receiving apparatus is an information device installed in the mobile object, an information device carried by a user of the mobile object or a caretaker, or a control device that controls the power transmitting device.

Item 14

The method according to any of Items 9 to 13, in which the other receiving apparatus includes an automotive navigation system, a smartphone, a tablet computer, a vehicle, a robot, or a controller included in a control device that controls the power transmitting device.

Item 15

The method according to any of Items 9 to 14, in which at least either the power transmitting device or the mobile object includes a foreign object removal mechanism, and in which, if the measured surface temperature of the metal foreign object is equal to or higher than the threshold, the foreign object removal mechanism of at least either the power transmitting device or the mobile object is caused to perform an operation for removing a foreign object.

Item 16

The method according to any of Items 9 to 15, in which, after the operation for removing a foreign object is performed, whether the metal foreign object has been actually removed is detected, and a signal indicating a result of the detection is transmitted to the other receiving apparatus.

Item 17

The method according to any of Item 9 to 16, in which the power transmitting device and the mobile object each include a foreign object removal mechanism, in which, if the measured surface temperature of the metal foreign object is equal to or higher than the threshold, the foreign object removal mechanism of the power transmitting device or the mobile object is caused to perform an operation for removing a foreign object, in which, after the operation for removing a foreign object is performed, whether the metal foreign object has been actually removed is detected, and in which, if the metal foreign object has not been removed, the foreign object removal mechanism of the other of the power transmitting device and the mobile object is caused to perform another operation for removing a foreign object.

Item 18

The method according to any of Items 9 to 17, in which, if the detected surface temperature of the metal foreign object is equal to or higher than the threshold, the power transmitting coil is caused to reduce the output power or stop outputting the power.

Item 19

The method according to any of Items 9 to 18, in which, after the power transmitting device transmits a first signal indicating the presence of the metal foreign object to the other receiving apparatus, the other receiving apparatus receives the first signal and transmits, to the power transmitting device, a second signal for reducing the power or stopping outputting the power, in which, upon receiving the second signal, the power transmitting device reduces the power or stops outputting the power, and in which, after the power transmitting device transmits the first signal indicating the presence of the metal foreign object to the other receiving apparatus and receives, from the other receiving apparatus, an instruction to reduce the power output from the power transmitting coil or stop outputting the power from the power transmitting coil, the power transmitting device causes the power transmitting coil to reduce the output power or stop outputting the power.

Item 20

A power transmitting device comprising:

an inverter that generates power;

a power transmitting coil that transmits the power wirelessly to a power receiving coil included in a power receiving device in a mobile object;

a thermal sensor that measures a surface temperature of a metal foreign object on the power transmitting coil; and a power transmission control circuitry that causes the inverter to control the power output from the power transmitting coil, causes the power transmitting coil to output the power before the power receiving coil and the power transmitting coil are electromagnetically coupled with each other and the mobile object overlaps the power transmitting coil, causes the thermal sensor to measure the surface temperature of the metal foreign object, and transmits, if the measured surface temperature of the metal foreign object is equal to or higher than a threshold, a signal indicating presence of the metal foreign object from the power transmitting device to another receiving apparatus, other than the power transmitting device, having a function of receiving the signal.

Item 21

A method for detecting a metal foreign object using a power transmission device, the power transmission device including:

an inverter that generates power;

a power transmitting coil for outputting power to a power receiving coil included in a mobile object;

a thermal sensor that detects a surface temperature of the metal foreign object on the power transmitting coil;

a foreign object removal mechanism; and a power transmission control circuitry that causes the inverter to controls the power output from the power transmitting coil;

the method comprising causing the power transmission control circuitry to:

cause the power transmitting coil to output the power before the power receiving coil and the power transmitting coil are electromagnetically coupled with each other and the mobile object overlaps the power transmitting coil;

cause the thermal sensor to measure the surface temperature of the metal foreign object; and causing, if the measured surface temperature of the metal foreign object is equal to or higher than a threshold, the foreign object removal mechanism to perform an operation for removing a foreign object.

Item 22

The method according to Item 21, in which, after the operation for removing a foreign object is performed, whether the metal foreign object has been actually removed is detected, and a signal indicating a result of the detection is transmitted to another receiving apparatus other than the power transmitting device.

The techniques in the present disclosure can be applied to any case in which power is wirelessly supplied to a mobile object such as a vehicle. For example, the techniques in the present disclosure can be used to supply power to a mobile object on a road or in a parking lot or a factory.

What is claimed is:

1. A method for detecting a metal foreign object using a power transmitting device, the power transmitting device including:
   an inverter that generates power;
   a power transmitting coil for outputting power to a power receiving coil included in a mobile object;
   a thermal sensor that measures a surface temperature of the metal foreign object on the power transmitting coil; and
   a power transmission control circuitry that causes the inverter to control the power output from the power transmitting coil;
   the method comprising causing the power transmission control circuitry to:
   cause the power transmitting coil to output the power before the power receiving coil and the power transmitting coil are electromagnetically coupled with each other and the mobile object overlaps the power transmitting coil;
   cause the thermal sensor to measure a temperature distribution in a target area including the metal foreign object on the power transmitting coil; and
   transmit, if the measured surface temperature of the metal foreign object is equal to or higher than a threshold, information indicating a relative positional relationship between the power transmitting coil and the metal foreign object on the basis of the measured temperature distribution.

2. The method according to claim 1,
   wherein the power output from the power transmitting coil includes first power for detecting the metal foreign object and second power to be transmitted from the power transmitting coil to the power receiving coil,
   wherein the first power is smaller than the second power,
   wherein the power transmitting coil is caused to output the first power before the mobile object including the power receiving coil overlaps the power transmitting coil, and
   wherein the thermal sensor is caused to measure the surface temperature of the metal foreign object while the first power is being output.

3. The method according to claim 1,
   wherein the power transmitting device further includes a position sensor that measures a distance between the mobile object and the power transmitting coil or a position of the mobile object, and
   wherein it is determined on the basis of a result of the measurement performed by the position sensor that the power receiving coil does not overlap the power transmitting coil.

4. The method according to claim 1,
   wherein the information is transmitted to another receiving apparatus which is an information device installed in the mobile object, an information device carried by a user of the mobile object or a caretaker, or a control device that controls the power transmitting device.

5. The method according to claim 1,
   wherein the information is transmitted to another receiving apparatus which includes an automotive navigation system, a smartphone, a tablet computer, a vehicle, a robot, or a controller included in a control device that controls the power transmitting device.

6. The method according to claim 1,
   wherein at least either the power transmitting device or the mobile object includes a foreign object removal mechanism, and
   wherein, if the measured surface temperature of the metal foreign object is equal to or higher than the threshold, the foreign object removal mechanism of at least either the power transmitting device or the mobile object is caused to perform an operation for removing a foreign object.

7. The method according to claim 6,
   wherein, after the operation for removing a foreign object is performed, whether the metal foreign object has been actually removed is detected, and a signal indicating a result of the detection is transmitted to another receiving apparatus.

8. The method according to claim 6,
   wherein the power transmitting device and the mobile object each include a foreign object removal mechanism,
   wherein, if the measured surface temperature of the metal foreign object is equal to higher than the threshold, one of the foreign object removal mechanism of the power transmitting device and the mobile object is caused to perform the operation for removing a foreign object,
   wherein, after the operation for removing a foreign object is performed, whether the metal foreign object has been actually removed is detected, and
   wherein, if the metal foreign object has not been removed, the other foreign object removal mechanism of the power transmitting device and the mobile object is caused to perform another operation for removing a foreign object.

9. The method according to claim 1,
   wherein, if the measured surface temperature of the metal foreign object is equal to or higher than the threshold, the power transmitting coil is caused to reduce the power or stop outputting the power.

10. The method according to claim 1,
    wherein, after the power transmitting device transmits a first signal indicating the presence of the metal foreign object to a receiving apparatus, the receiving apparatus receives the first signal and transmits, to the power transmitting device, a second signal for reducing the power or stopping outputting the power, and
    wherein, upon receiving the second signal, the power transmitting device reduces the power or stops outputting the power.

11. A power transmitting device comprising:
    an inverter that generates power;
    a power transmitting coil that transmits the power wirelessly to a power receiving coil included in a power receiving device in a mobile object;
    a thermal sensor that measures a surface temperature of a metal foreign object on the power transmitting coil; and a power transmission control circuitry that causes the inverter to control the power output from the power transmitting coil, causes the power transmitting coil to output the power before the power receiving coil and the power transmitting coil are electromagnetically coupled with each other and the mobile object overlaps the power transmitting coil, causes the thermal sensor to measure a temperature distribution in a target area including the metal foreign object on the power transmitting coil, and transmits, if the measured surface temperature of the metal foreign object is equal to or higher than a threshold, information indicating a relative positional relationship between the power transmitting coil and the metal foreign object on the basis of the measured temperature distribution.

12. A method for detecting a metal foreign object using a power transmission device, the power transmission device including:
   an inverter that generates power;
   a power transmitting coil for outputting power to a power receiving coil included in a mobile object;
   a thermal sensor that detects a surface temperature of the metal foreign object on the power transmitting coil;
   a foreign object removal mechanism; and
   a power transmission control circuitry that causes the inverter to control the power output from the power transmitting coil;

the method comprising causing the power transmission control circuitry to:

cause the power transmitting coil to output the power to heat the metal foreign object before the power receiving coil and the power transmitting coil are electromagnetically coupled with each other and the mobile object overlaps the power transmitting coil;

cause the thermal sensor to measure the surface temperature of the heated metal foreign object; and causing, if the measured surface temperature of the metal foreign object is equal to or higher than a threshold, the foreign object removal mechanism to perform an operation for removing a foreign object.

13. The method according to claim 12,
wherein, after the operation for removing a foreign object is performed, whether the metal foreign object has been actually removed is detected, and a signal indicating a result of the detection is transmitted to a receiving apparatus other than the power transmitting device.

* * * * *